US012700002B2

(12) United States Patent
Wang et al.

(10) Patent No.: US 12,700,002 B2
(45) Date of Patent: Aug. 4, 2026

(54) PAYMENT METHOD, TERMINAL DEVICES, SERVERS, SYSTEMS AND MEDIUM

(71) Applicant: CHINA UNIONPAY CO., LTD., Shanghai (CN)

(72) Inventors: Yu Wang, Shanghai (CN); Zhuo Chen, Shanghai (CN); He Huang, Shanghai (CN); Zhimin Xie, Shanghai (CN); Xinyuan Xu, Shanghai (CN); Zhangyuan Ye, Shanghai (CN); Yongsheng Huang, Shanghai (CN); Jien Zhou, Shanghai (CN); Wei Li, Shanghai (CN); Xi Shen, Shanghai (CN); Zhixiong Tang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/845,693

(22) PCT Filed: Oct. 8, 2022

(86) PCT No.: PCT/CN2022/123922
§ 371 (c)(1),
(2) Date: Sep. 10, 2024

(87) PCT Pub. No.: WO2023/168938
PCT Pub. Date: Sep. 14, 2023

(65) Prior Publication Data
US 2025/0182115 A1     Jun. 5, 2025

(30) Foreign Application Priority Data
Mar. 10, 2022     (CN) .......................... 202210238575.1

(51) Int. Cl.
*G06Q 20/40* (2012.01)
*G06Q 20/38* (2012.01)

(52) U.S. Cl.
CPC ..... *G06Q 20/4014* (2013.01); *G06Q 20/3829* (2013.01); *G06Q 20/407* (2013.01)

(58) Field of Classification Search
None
See application file for complete search history.

(56) References Cited

U.S. PATENT DOCUMENTS

2018/0114224 A1*   4/2018   Newland .............. G06Q 20/326
2018/0330362 A1*  11/2018   Wu ................... G06K 19/06037
(Continued)

FOREIGN PATENT DOCUMENTS

CN        106304074 A      1/2017
CN        106600266 A      4/2017
(Continued)

OTHER PUBLICATIONS

The World Intellectual Property Organization (WIPO) International Search Report for PCT/CN2022/123922 Dec. 15, 2022 6 Pages (including translation).

*Primary Examiner* — Patrick Mcatee
*Assistant Examiner* — Jason B Fenstermacher
(74) *Attorney, Agent, or Firm* — ANOVA LAW GROUP, PLLC

(57) ABSTRACT

A payment includes: in response to a received payment request message, sending a security verification request message to a security control system, the security verification request message is used to instruct the security control system to perform security verification according to security verification information; receiving security verification result information sent by the security control system; when the security verification result information indicates that the security verification is passed, sending a first notification message to the SDK, the first notification message instructs the SDK to notify the host program to display a user verification page to prompt the user to enter the first user (Continued)

verification input information, the first user verification input information is used for the host program server to perform user verification to obtain user verification result information; when the user verification result information indicates that the user verification is passed, initiating a payment request to complete the payment.

20 Claims, 15 Drawing Sheets

(56) References Cited

U.S. PATENT DOCUMENTS

| | | | | |
|---|---|---|---|---|
| 2019/0012216 A1* | 1/2019 | Pennell | | G06F 9/541 |
| 2019/0095918 A1* | 3/2019 | Stewart | | G06Q 20/227 |
| 2019/0132309 A1* | 5/2019 | Wei | | H04L 63/0823 |
| 2021/0012343 A1* | 1/2021 | Theodoro | | G06Q 20/227 |
| 2021/0123431 A1 | 4/2021 | Jaaskelainen et al. | | |
| 2021/0182850 A1* | 6/2021 | Morse | | G06Q 20/385 |
| 2021/0374701 A1 | 12/2021 | Akgun et al. | | |
| 2022/0036339 A1* | 2/2022 | Guo | | G06Q 20/3821 |
| 2024/0078304 A1* | 3/2024 | Chen | | H04L 63/0853 |
| 2024/0362613 A1* | 10/2024 | Wang | | G06Q 20/325 |

FOREIGN PATENT DOCUMENTS

| | | | |
|---|---|---|---|
| CN | 206993151 U | 2/2018 | |
| CN | 109801050 A | 5/2019 | |
| CN | 112966196 A | 6/2021 | |
| CN | 113298523 A | 8/2021 | |
| CN | 114638608 A | 6/2022 | |
| JP | 2005275459 A | 10/2005 | |
| JP | 2009289063 A | 12/2009 | |
| JP | 2015087832 A | 5/2015 | |
| JP | 2017102754 A | 6/2017 | |
| JP | 2020057392 A | 4/2020 | |
| JP | 2020102070 A | 7/2020 | |
| KR | 20160043075 A | 4/2016 | |
| WO | 0188785 A1 | 11/2001 | |
| WO | 2021208744 A1 | 10/2021 | |

* cited by examiner

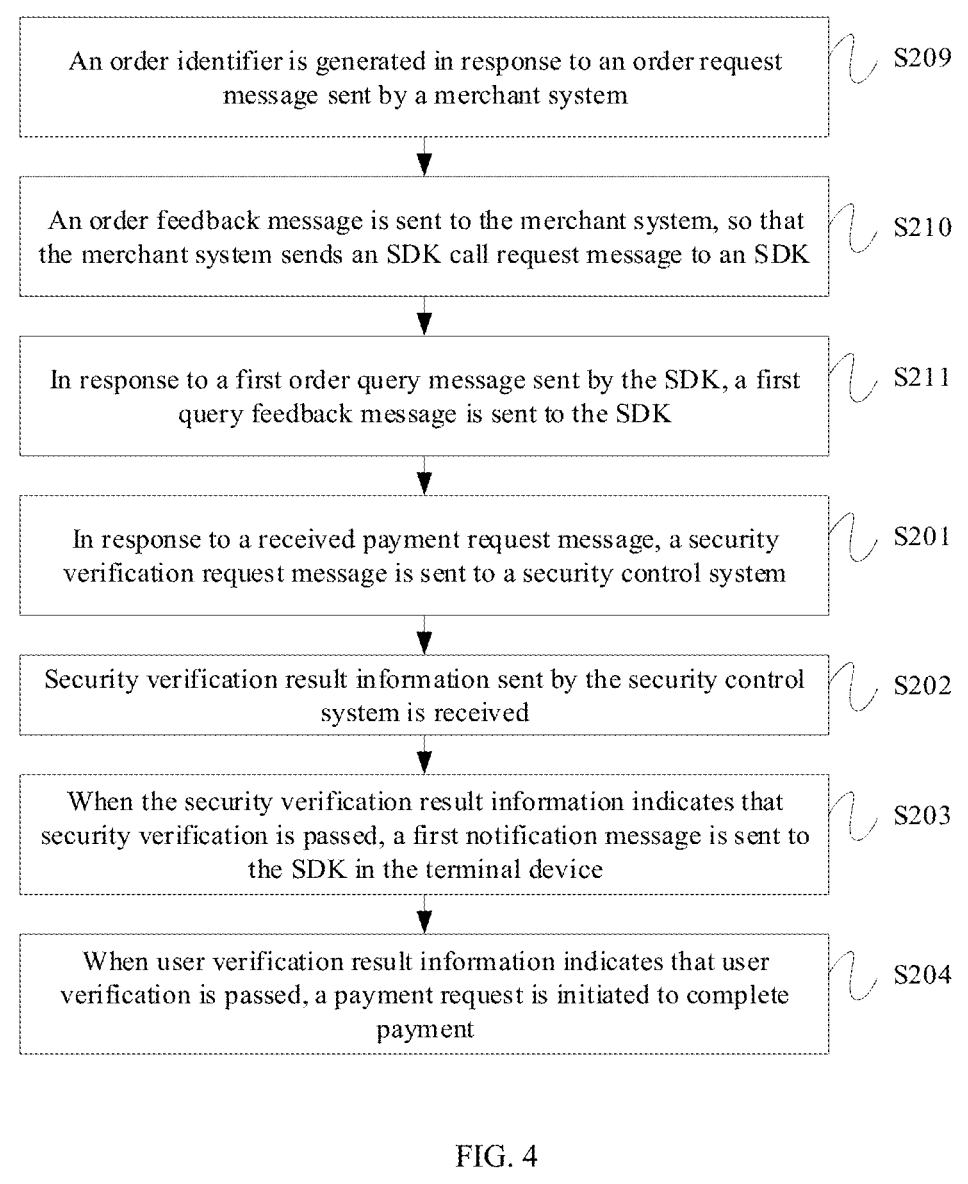

An order identifier is generated in response to an order request message sent by a merchant system          S209

An order feedback message is sent to the merchant system, so that the merchant system sends an SDK call request message to an SDK          S210

In response to a first order query message sent by the SDK, a first query feedback message is sent to the SDK          S211

In response to a received payment request message, a security verification request message is sent to a security control system          S201

Security verification result information sent by the security control system is received          S202

When the security verification result information indicates that security verification is passed, a first notification message is sent to the SDK in the terminal device          S203

When user verification result information indicates that user verification is passed, a payment request is initiated to complete payment          S204

FIG. 4

Figures 6, 7:
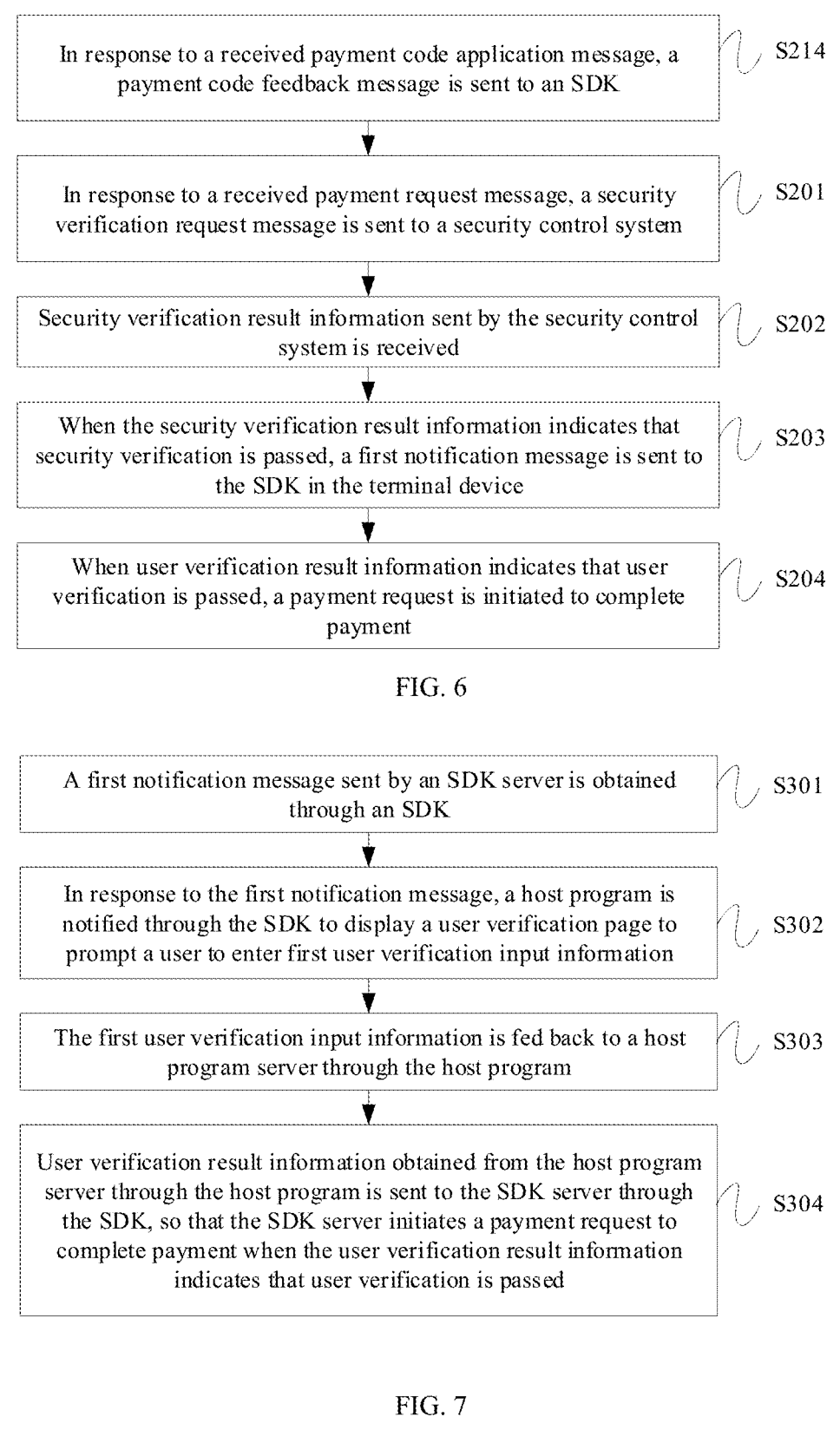

In response to a received payment code application message, a payment code feedback message is sent to an SDK

S214

In response to a received payment request message, a security verification request message is sent to a security control system

S201

Security verification result information sent by the security control system is received

S202

When the security verification result information indicates that security verification is passed, a first notification message is sent to the SDK in the terminal device

S203

When user verification result information indicates that user verification is passed, a payment request is initiated to complete payment

A first notification message sent by an SDK server is obtained through an SDK

S301

In response to the first notification message, a host program is notified through the SDK to display a user verification page to prompt a user to enter first user verification input information

S302

The first user verification input information is fed back to a host program server through the host program

S303

User verification result information obtained from the host program server through the host program is sent to the SDK server through the SDK, so that the SDK server initiates a payment request to complete payment when the user verification result information indicates that user verification is passed

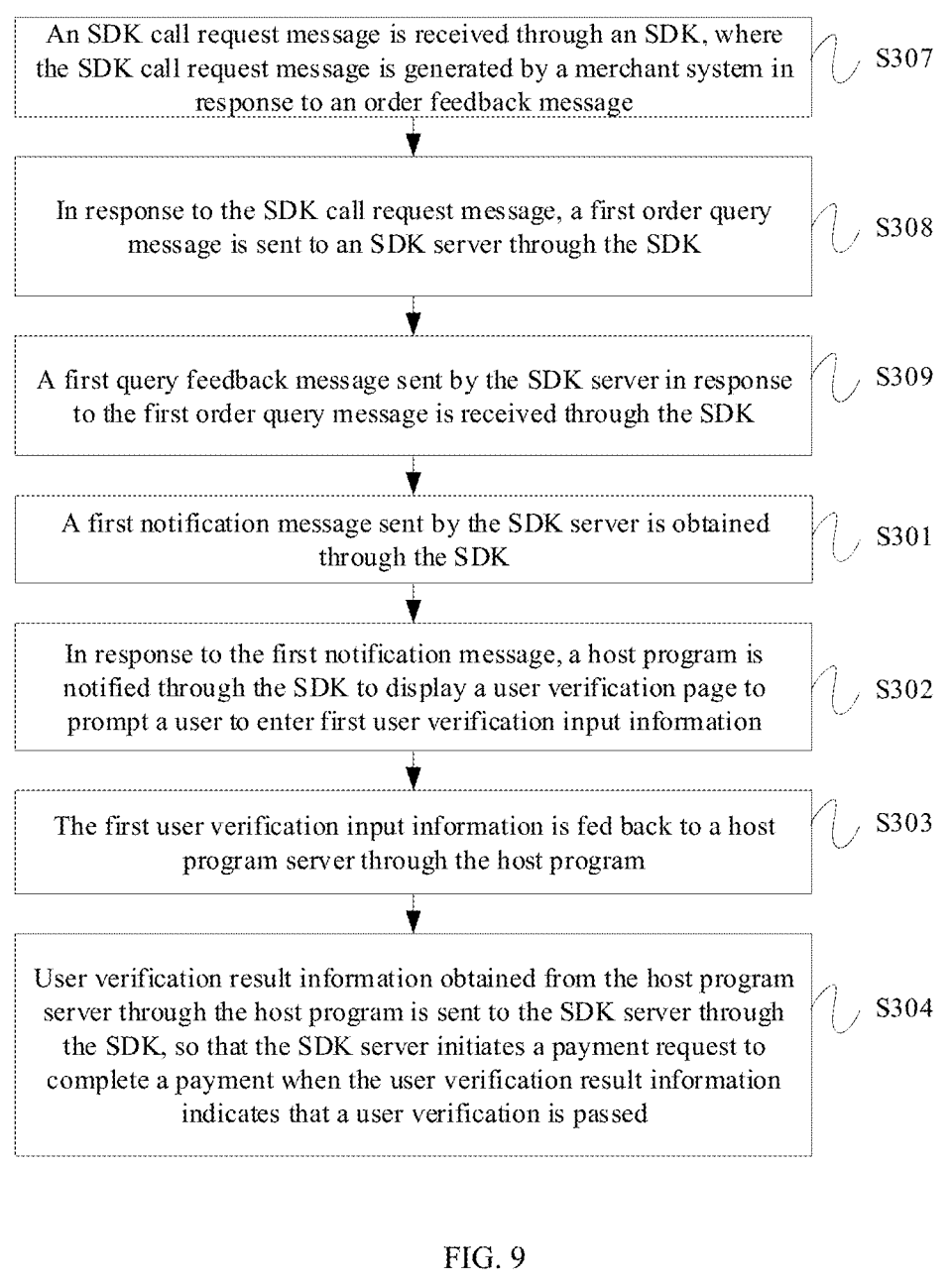

An SDK call request message is received through an SDK, where the SDK call request message is generated by a merchant system in response to an order feedback message    S307

↓

In response to the SDK call request message, a first order query message is sent to an SDK server through the SDK    S308

↓

A first query feedback message sent by the SDK server in response to the first order query message is received through the SDK    S309

↓

A first notification message sent by the SDK server is obtained through the SDK    S301

↓

In response to the first notification message, a host program is notified through the SDK to display a user verification page to prompt a user to enter first user verification input information    S302

↓

The first user verification input information is fed back to a host program server through the host program    S303

↓

User verification result information obtained from the host program server through the host program is sent to the SDK server through the SDK, so that the SDK server initiates a payment request to complete a payment when the user verification result information indicates that a user verification is passed    S304

FIG. 9

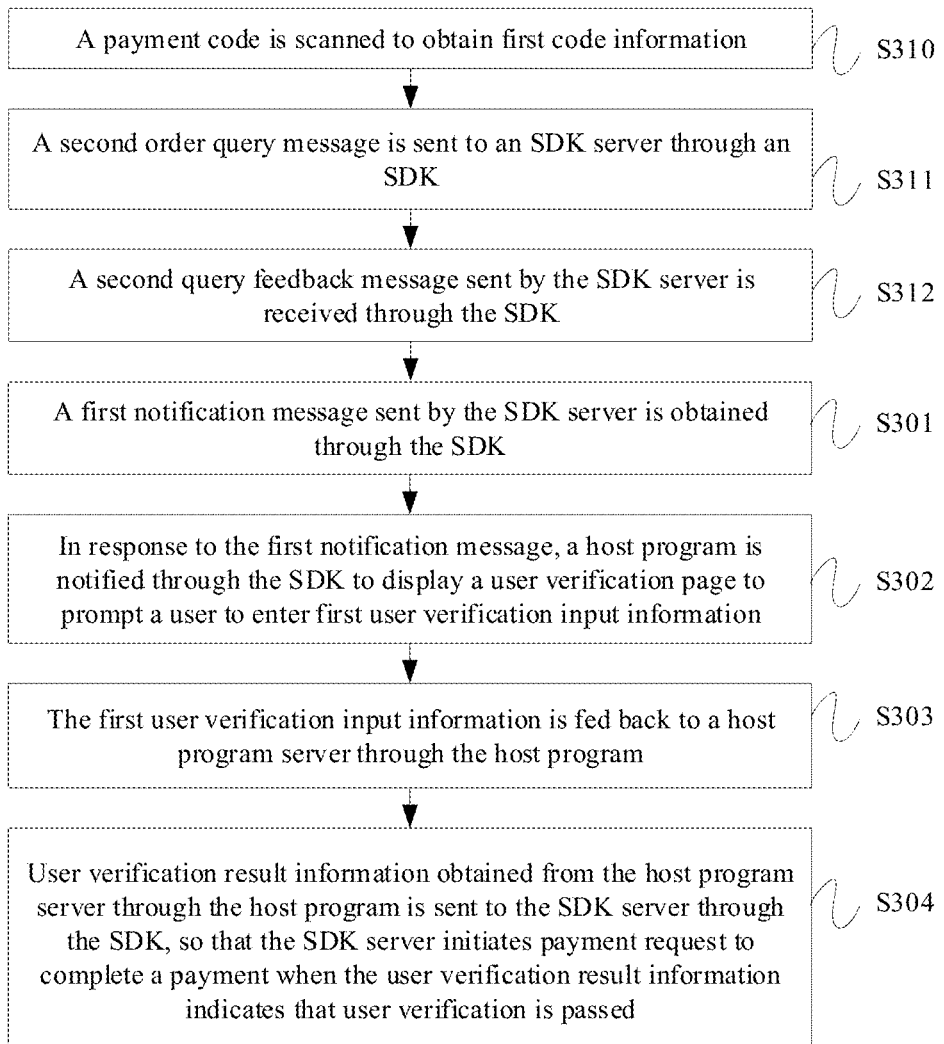

A payment code is scanned to obtain first code information — S310

A second order query message is sent to an SDK server through an SDK — S311

A second query feedback message sent by the SDK server is received through the SDK — S312

A first notification message sent by the SDK server is obtained through the SDK — S301

In response to the first notification message, a host program is notified through the SDK to display a user verification page to prompt a user to enter first user verification input information — S302

The first user verification input information is fed back to a host program server through the host program — S303

User verification result information obtained from the host program server through the host program is sent to the SDK server through the SDK, so that the SDK server initiates payment request to complete a payment when the user verification result information indicates that user verification is passed — S304

FIG. 10

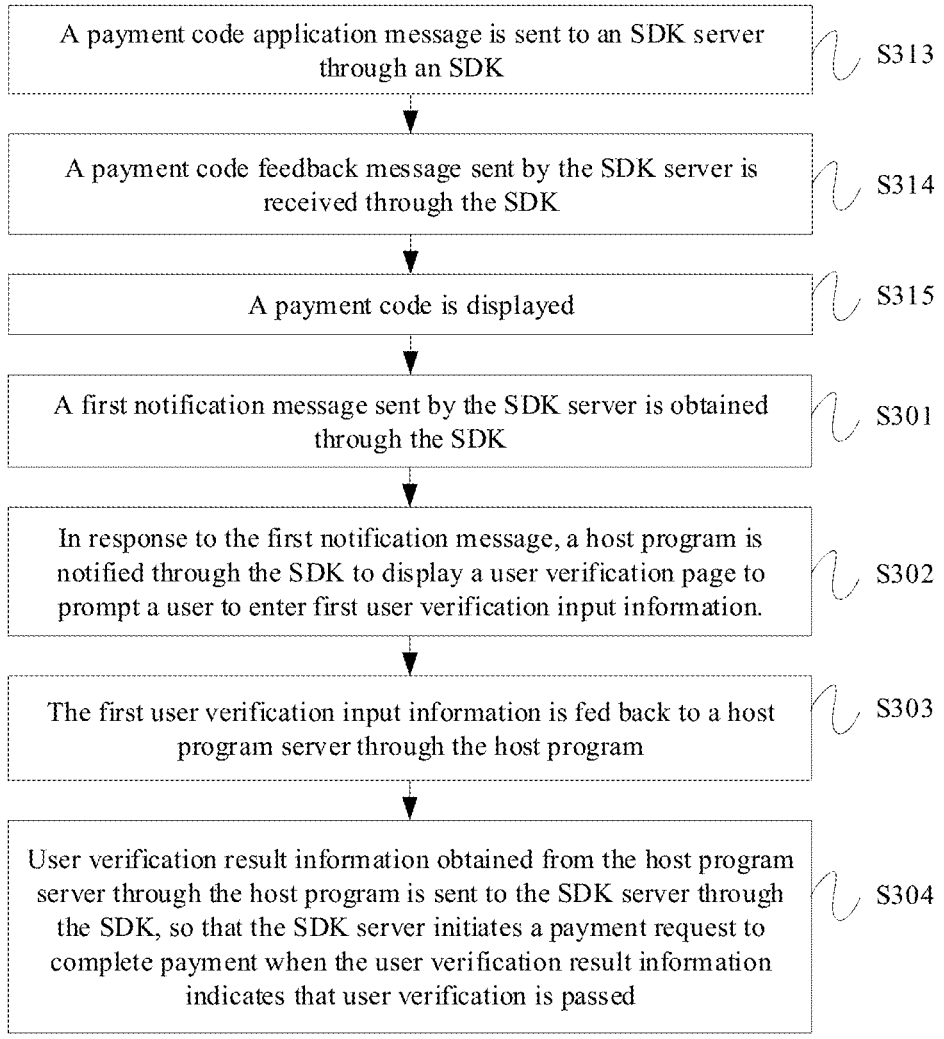

A payment code application message is sent to an SDK server through an SDK — S313

A payment code feedback message sent by the SDK server is received through the SDK — S314

A payment code is displayed — S315

A first notification message sent by the SDK server is obtained through the SDK — S301

In response to the first notification message, a host program is notified through the SDK to display a user verification page to prompt a user to enter first user verification input information. — S302

The first user verification input information is fed back to a host program server through the host program — S303

User verification result information obtained from the host program server through the host program is sent to the SDK server through the SDK, so that the SDK server initiates a payment request to complete payment when the user verification result information indicates that user verification is passed — S304

FIG. 11

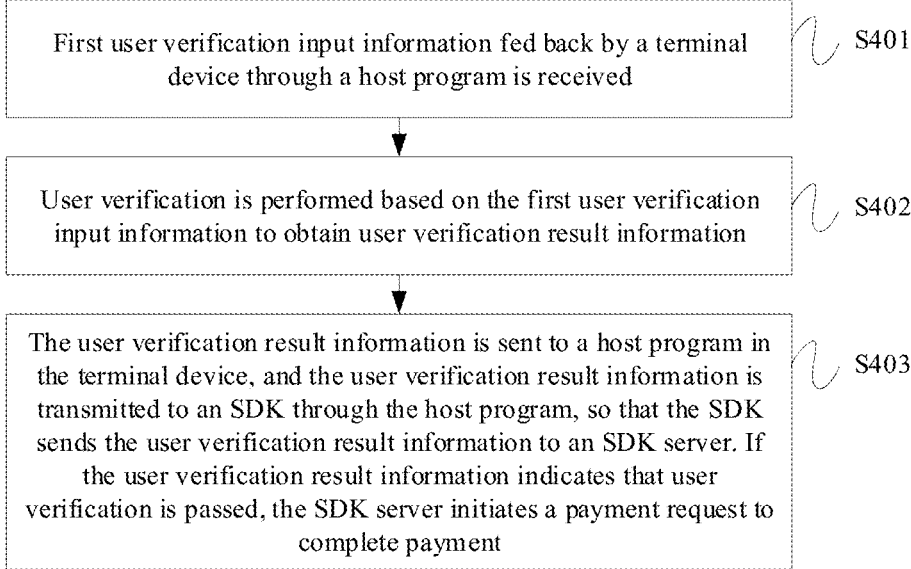

First user verification input information fed back by a terminal device through a host program is received    S401

User verification is performed based on the first user verification input information to obtain user verification result information    S402

The user verification result information is sent to a host program in the terminal device, and the user verification result information is transmitted to an SDK through the host program, so that the SDK sends the user verification result information to an SDK server. If the user verification result information indicates that user verification is passed, the SDK server initiates a payment request to complete payment    S403

FIG. 12

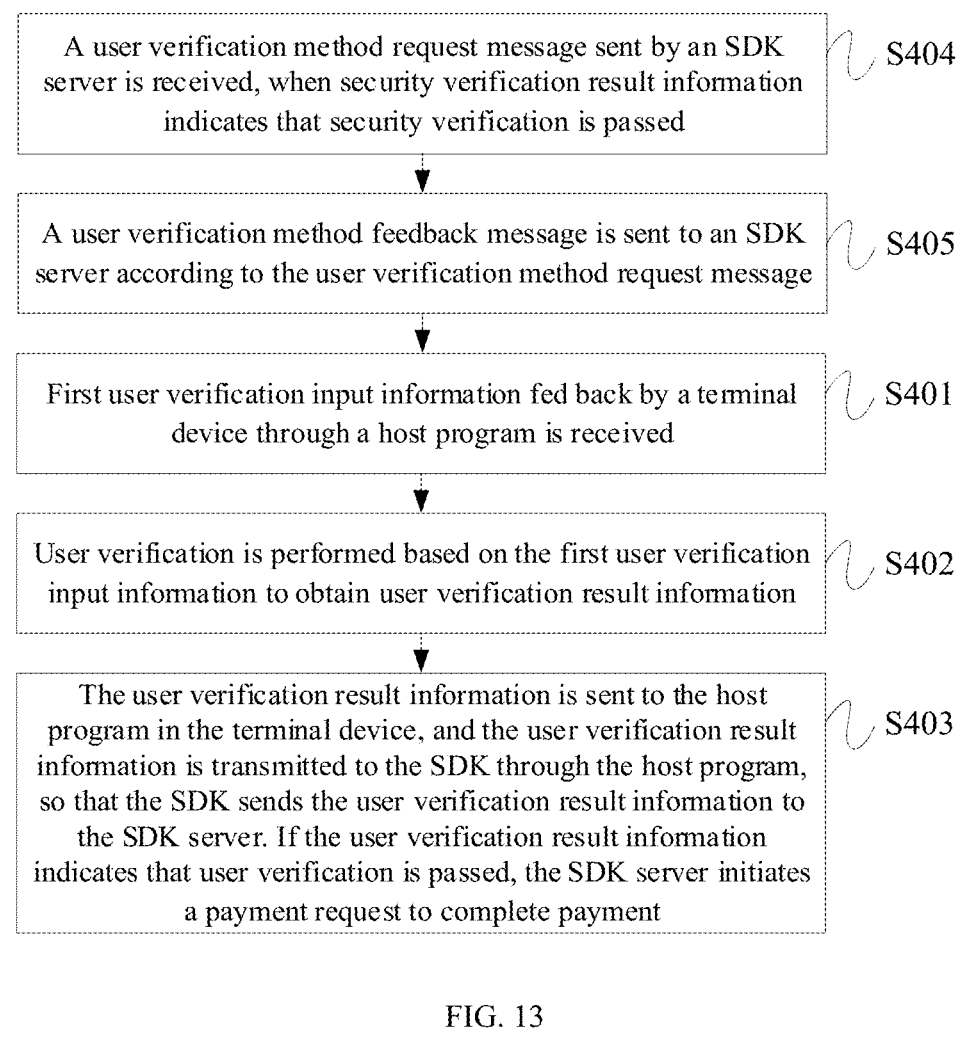

A user verification method request message sent by an SDK server is received, when security verification result information indicates that security verification is passed    S404

A user verification method feedback message is sent to an SDK server according to the user verification method request message    S405

First user verification input information fed back by a terminal device through a host program is received    S401

User verification is performed based on the first user verification input information to obtain user verification result information    S402

The user verification result information is sent to the host program in the terminal device, and the user verification result information is transmitted to the SDK through the host program, so that the SDK sends the user verification result information to the SDK server. If the user verification result information indicates that user verification is passed, the SDK server initiates a payment request to complete payment    S403

FIG. 13

PAYMENT METHOD, TERMINAL DEVICES, SERVERS, SYSTEMS AND MEDIUM

CROSS-REFERENCE TO RELATED APPLICATION

This application is a national phase entry under 35 U.S.C. § 371 of International Application No. PCT/CN2022/123922, filed on Oct. 8, 2022, which claims priority to Chinese patent application 202210238575.1 filed on Mar. 10, 2022, entitled "PAYMENT METHOD, TERMINAL DEVICE, SERVER, SYSTEM AND MEDIUM," the entire content of all of which is incorporated herein by reference.

FIELD OF THE DISCLOSURE

The application generally relates to the field of data processing and, more particularly, relates to a payment method, terminal device, server, system and medium.

BACKGROUND

With the development of payment technology, electronic payment is more and more widely used. Users may make payments through terminal devices. The terminal devices are installed with application programs and software development kits (SDKs). SDKs may be integrated into applications to jointly implement payments.

Two entities are involved in a payment process in a terminal device: an application and an SDK. As the number of entities involved in the payment process increases, the security risks of payment also increase. Therefore, a payment method that may improve security is urgently needed.

SUMMARY

The present disclosure provides a payment method, terminal device, server, system and medium, which may improve the security of payment.

In a first aspect, embodiments of the present disclosure provide a payment method using a software development kit (SDK) server, the method including: in response to a received payment request message, sending a security verification request message to a security control system, where the security verification request message includes security verification information for instructing a security control system to perform a security verification for a payment corresponding to the payment request message according to the security verification information; receiving security verification result information sent by the security control system; when the security verification result information indicates that the security verification is passed, sending a first notification message to an SDK in a terminal device, where the terminal device has the SDK and a host program, the first notification message is used to instruct the SDK to notify the host program to display a user verification page to prompt a user to enter first user verification input information, where the first user verification input information is used by a host program server to perform user verification to obtain user verification result information; and when the user verification result information indicates that the user verification is passed, initiating a payment request to complete the payment.

In a second aspect, embodiments of the present disclosure provide a payment method, which is applied to a terminal device, and the terminal device has an SDK and a host program. The method includes: obtaining a first notification message sent by an SDK server through the SDK, where the first notification message is sent by the SDK server based on security verification result information indicating that a security verification is passed, where the security verification result information is obtained by security verification, of a payment corresponding to a payment request message, by a security control system based on security verification information in a security verification request message, and the security verification request message is sent by the SDK server in response to a received payment request message; in response to the first notification message, notifying the host program through the SDK to display a user verification page to prompt a user to enter first user verification input information; feeding back the first user verification input information to a host program server through the host program, where the first user verification input information is used by the host program server to perform user verification to obtain user verification result information; and sending, through the SDK to the SDK server, the user verification result information obtained from the host program server through the host program, so that the SDK server initiates a payment request to complete the payment when the user verification result information indicates that the user verification is passed.

In a third aspect, embodiments of the present disclosure provide a payment method, which uses a host program server, and the method includes: receiving first user verification input information fed back by a terminal device through a host program, where the terminal device has an SDK and the host program, the first user verification input information is obtained by the SDK in response to a first notification message to notify the host program to display a user verification page, the first notification message is sent by an SDK server based on security verification result information indicating that security verification is passed, the security verification result information is obtained by a security control system based on security verification of a payment corresponding to a payment request message based on security verification information included in a security verification request message, and the security verification request message is sent by the SDK server in response to the received payment request message; performing user verification according to the first user verification input information to obtain user verification result information; and sending the user verification result information to the host program in the terminal device, and transmitting the user verification result information to the SDK through the host program, so that the SDK sends the user verification result information to the SDK server, and when the user verification result information indicates that the user verification is passed, causing the SDK server to initiate a payment request to complete the payment.

In a fourth aspect, embodiments of the present disclosure provide an SDK server, including: a transmitting module, configured to respond to a received payment request message and send a security verification request message to a security control system, where the security verification request message includes security verification information and is used to instruct the security control system to perform security verification on a payment corresponding to the payment request message based on the security verification information; and a receiving module, configured to receive security verification result information sent by the security control system, where: the transmitting module is further configured to send a first notification message to an SDK in a terminal device when the security verification result information indicates that the security verification is passed, where the terminal device has the SDK and a host program, the first notification message is used to instruct the SDK to notify the host program to display a user verification page to prompt a user to enter first user verification input information, where the first user verification input information is used for a host program server to perform user verification to obtain user verification result information.

In a fifth aspect, embodiments of the present disclosure provide a terminal device, including an SDK and a host program, and the terminal device includes: a receiving module configured to obtain a first notification message sent by an SDK server through the SDK, where the first notification message is sent by the SDK server based on security verification result information indicating that security verification is passed, the security verification result information is obtained by a security control system based on security verification of a payment corresponding to a payment request message based on security verification information included in a security verification request message, and the security verification request message is sent by the SDK server in response to the received payment request message; a display module configured to, in response to the first notification message, notify the host program through the SDK to display a user verification page to prompt a user to enter first user verification input information; and a transmitting module, configured to feed back the first user verification input information to a host program server through the host program, where the first user verification input information is used by the host program server to perform user verification to obtain user verification result information, where the transmitting module is further configured to send the user verification result information, obtained from the host program server through the host program, to the SDK server through the SDK, so that the SDK server initiates a payment request to complete the payment when the user verification result information indicates that the user verification is passed.

In a sixth aspect, embodiments of the present disclosure provide a host program server, including: a receiving module, configured to receive first user verification input information fed back by a terminal device through a host program, where the terminal device has an SDK and the host program, the first user verification input information is obtained by the SDK in response to a first notification message to notify the host program to display a user verification page, the first notification message is sent by an SDK server based on security verification result information indicating that security verification is passed, the security verification result information is obtained by a security control system based on security verification of a payment corresponding to a payment request message based on security verification information included in a security verification request message, and the security verification request message is sent by the SDK server in response to the received payment request message; a verification module, configured to perform user verification based on the first user verification input information and obtain user verification result information; and a transmitting module, configured to send the user verification result information to the host program in the terminal device, and transmit the user verification result information to the SDK through the host program, so that the SDK sends the user verification result information to the SDK, and when the user verification result information indicates that the user verification is passed, the SDK server initiates a payment request to complete the payment.

In a seventh aspect, embodiments of the present disclosure provide provides an SDK server, including: a processor and a memory storing computer program instructions; when the processor executes the computer program instructions, the payment method of the first aspect is implemented.

In an eighth aspect, embodiments of the present disclosure provide a terminal device, including: a processor and a memory storing computer program instructions; when the processor executes the computer program instructions, the payment method of the second aspect is implemented.

In a ninth aspect, embodiments of the present disclosure provide a host program server, including: a processor and a memory storing computer program instructions; when the processor executes the computer program instructions, the payment method of the third aspect is implemented.

In a tenth aspect, embodiments of the present disclosure provide a payment system, including the SDK server of the seventh aspect, the terminal device of the eighth aspect, and the host program server of the ninth aspect.

In an eleventh aspect, embodiments of the present disclosure provide a computer-readable storage medium having computer program instructions stored thereon, and when the computer program instructions are executed by a processor, the payment method of the first aspect, the payment method of the second aspect, or the payment method of the third aspect is implemented.

Embodiments of the present disclosure provide a payment method, terminal device, server, system and medium. The SDK server responds to a payment request message and sends a security verification request message to a security control system, to request the security control system to perform security verification on this payment to complete the security verification required by the SDK owner. When the security verification is passed, the SDK server sends a message to the SDK of the terminal device to instruct the SDK to notify a host program to display a user verification page, so that the SDK triggers the host program to actively initiate user verification to complete user identity security verification required by the host program owner. In the payment process, two-way verification of the SDK owner and the host program owner is achieved, which improves the security of payment.

BRIEF DESCRIPTION OF THE DRAWINGS

In order to more clearly illustrate the technical solution of the embodiments of the present disclosure, the following is a brief introduction to the drawings essential for the embodiments of the present disclosure. For a person skilled in the art, other drawings may be obtained based on these drawings without making creative efforts.

FIG. 4 is a flow chart of yet another payment method in accordance with an embodiment of the first aspect of the present disclosure;

FIG. 6 is a flow chart of yet another payment method in accordance with an embodiment of the first aspect of the present disclosure;

FIG. 7 is a flow chart of a payment method in accordance with an embodiment of the second aspect of the present disclosure;

FIG. 9 is a flow chart of yet another payment method in accordance with an embodiment of the second aspect of the present disclosure;

FIG. 10 is a flow chart of yet another payment method in accordance with an embodiment of the second aspect of the present disclosure;

FIG. 11 is a flow chart of yet another payment method in accordance with an embodiment of the second aspect of the present disclosure;

FIG. 12 is a flow chart of a payment method in accordance with an embodiment of the third aspect of the present disclosure;

FIG. 13 is a flow chart of another payment method in accordance with an embodiment of the third aspect of the present disclosure;

DETAILED DESCRIPTION

The features and exemplary embodiments of various aspects of the present disclosure will be described in detail below. To make the purpose, technical solutions and advantages of the present disclosure clearer, the present disclosure will be further described in detail below in conjunction with the accompanying drawings and specific embodiments. It should be understood that the specific embodiments described herein are merely intended to explain the present disclosure, rather than to limit the present disclosure. For those skilled in the art, the present disclosure may be implemented without the need for some of these specific details. The following description of the embodiments is merely to provide a better understanding of the present disclosure by showing examples of the present disclosure.

With the development of payment technology, the application of electronic payment is becoming increasingly widespread. Users may make payments through terminal devices. Terminal devices are equipped with payment applications, but the functions of the applications are limited. To make the payment function more comprehensive, an SDK may also be configured in the terminal device. SDK may be integrated into an application and implement payment together with the application. In this situation, a payment process in the terminal device involves two entities, the application and the SDK. As the number of entities involved in the payment process increases, the security risks of payment also increase. Therefore, a payment method that may improve security is urgently needed.

The present disclosure provides a payment method, terminal device, server, system and medium, which may perform double verification with SDK and host program as the main body, and complete a payment when both the verification with the SDK as the main body and the verification with the host program as the main body are passed. The security of SDK-related interactions and host program-related interactions is guaranteed by verification of both SDK and host program, thereby improving the security of the entire payment process.

Figure 1:
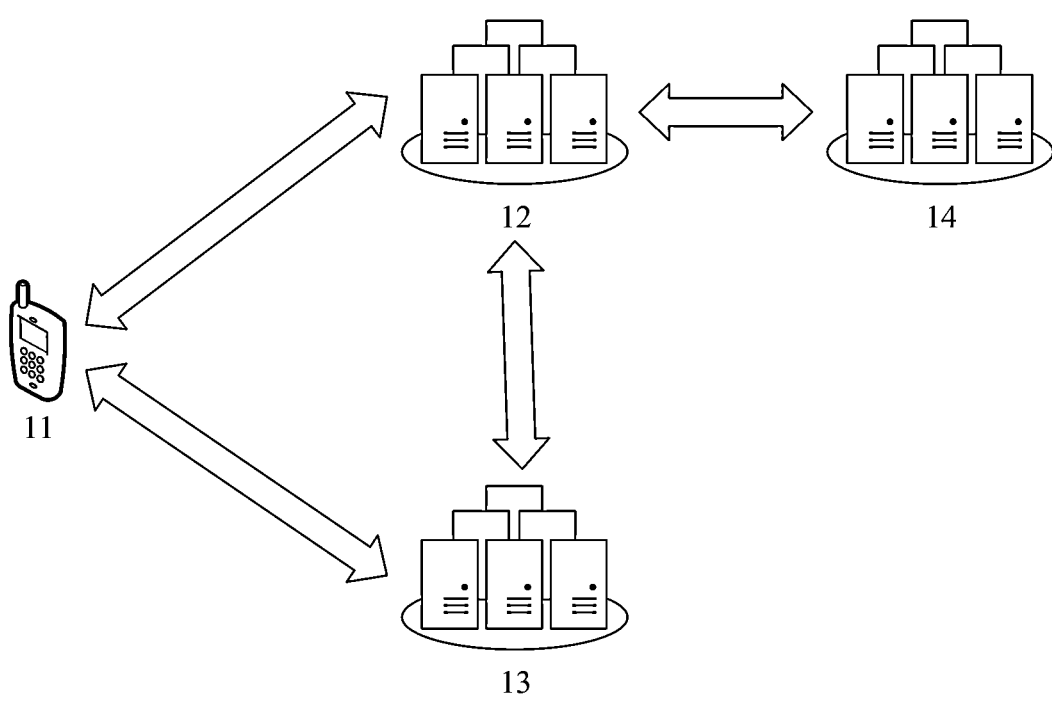
FIG. 1 is a schematic diagram of an example of an application scenario of a payment method in accordance with an embodiment of the present disclosure.

The payment methods provided in the present disclosure are applied to payment scenarios, which mainly involve a terminal device, an SDK backend system, a host program backend system and a security control system. FIG. 1 is a schematic diagram of an example of an application scenario of a payment method in accordance with an embodiment of the present disclosure. As shown in FIG. 1, a terminal device 11 may communicate and interact with an SDK backend system 12 and a host program backend system 13 respectively, and the SDK backend system 12 may also communicate and interact with the host program backend system 13 and a security control system 14 respectively.

The terminal device 11 has a host program and an SDK. The payment function of the terminal device 11 requires the host program to call the SDK to implement together. The SDK in the terminal device 11 may interact with the host program. The SDK in the terminal device 11 may communicate and interact with the SDK backend system 12, and the host program in the terminal device 11 may communicate and interact with the host program backend system 13. The terminal device 11 is a device that a user uses to make payments, which may specifically include a mobile phone, a tablet computer, an electronic computer, a smart wearable device, etc., which is not limited here.

The SDK backend system 12 is the backend system of the SDK, and may include more than one SDK server. The type and number of SDK servers in the SDK backend system 12 are not limited here. During a payment process, the terminal device 11 will send payment-related information to the SDK backend system 12 through the SDK. The SDK backend system 12 may also pre-store the account information and personal information of a paying user (payer).

In some embodiments, the SDK backend system 12 may include an SDK backend subsystem and a payment code subsystem. The SDK backend subsystem and payment code subsystem may communicate and interact with each other. The SDK backend subsystem may also communicate and interact with SDK in terminal device 11, and the payment code subsystem may communicate and interact with the host program backend system. The payment code subsystem stores relevant information of payment code and may manage and verify payment code. Payment code may include collection code, payment code, etc., and a payment code may be specifically a QR code or other forms of graphic code, which is not limited here.

The host program backend system 13 is the backend system of the host program, and may include more than one host program server. The type and number of host program servers in the host program backend system 13 are not limited here. During a payment process, the terminal device 11 interacts with the host program backend system 13 through the host program. The host program backend system 13 may also communicate and interact with the SDK backend system 12.

The security control system 14 may be configured to perform security verification on a payment, and may include more than one electronic device. The type and number of electronic devices in the security control system 14 are not limited here. The security control system 14 may communicate and interact with the SDK backend system 12. When the SDK backend system 12 includes the SDK backend subsystem and the payment code subsystem, the security control system 14 may communicate and interact with the SDK backend subsystem of the SDK backend system 12.

In some embodiments, the information transmission between the SDK and the host program in the terminal device 11 is encrypted transmission, that is, the information exchanged between the SDK and the host program in the terminal device 11 is encrypted information. The SDK and the host program each store the encryption and decryption algorithms required for encryption and decryption.

The encryption and decryption algorithms in the SDK and the host program may be configured according to the application environment, requirements, etc. For example, the encryption and decryption algorithms in the SDK and the host program may include the SM2 algorithm, the SM4 algorithm, the data encryption standard (DES), Rivest-Shamir-Adleman (RSA) algorithm, etc., which are not limited here. The keys required for the encryption and decryption algorithms in the SDK may be stored and managed by the SDK backend system 12, that is, the encryption and decryption keys in the SDK may be stored in the SDK server in the SDK backend system 12. The SDK may interact with the SDK backend system 12 to achieve encryption and decryption. The keys required for the encryption and decryption algorithms in the host program may be stored and managed by the host program backend system 13, that is, the encryption and decryption keys in the host program are stored in the host program server in the host program backend system 13. The host program may interact with the host program backend system 13 to achieve encryption and decryption. Through the ciphertext transmission between the SDK and the host program, the information transmitted between the SDK and the host program is not easily stolen, which may ensure the communication security between the SDK and the host program.

In some embodiments, the SDK in the terminal device 11 may have a security domain, and the information in the SDK may be stored in the security domain. The security domain may be an encrypted data storage space, which may be implemented by hardware and software, such as by a secure element (SE) and/or trusted execution environment (TEE). SDK may manage the permission of the security domain, such as dividing data that cannot be read openly and data that only the host program has permission to read.

The payment method, terminal device, server, system and medium in the present disclosure are described in sequence below.

Figure 2:
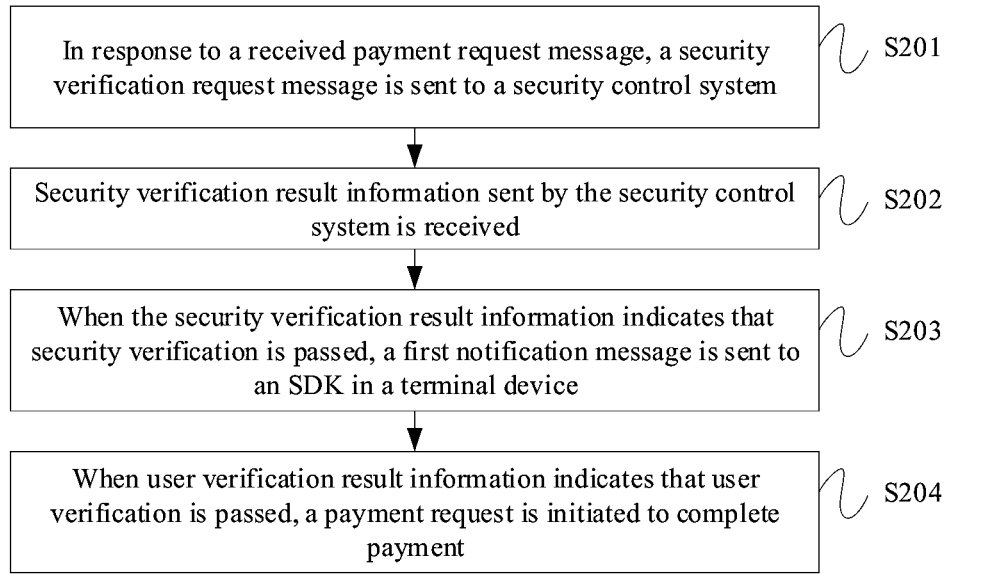
FIG. 2 is a flow chart of a payment method in accordance with an embodiment of the first aspect of the present disclosure.

The first aspect of the present disclosure provides a payment method, which is applied to an SDK server, that is, the payment method may be executed by the SDK server. FIG. 2 is a flow chart of an embodiment of a payment method in accordance with the first aspect of the present disclosure. As shown in FIG. 2, the payment method may include Steps S201 to S204.

In Step S201, in response to a received payment request message, a security verification request message is sent to a security control system.

The payment request message is used to initiate a payment. The payment request message may be sent by the SDK in the terminal device to the SDK server, or the payment request message may be sent by a payment acceptance device to the SDK server. When the SDK backend system includes the SDK backend subsystem and the payment code subsystem, the payment acceptance device may initiate a payment to an SDK server in the payment code subsystem. The SDK server in the payment code subsystem then sends the payment request message to an SDK server in the SDK backend subsystem. The payment request message may include order information, terminal device information, payment information, etc. Order information may include order identifier, order initiator, order details, order amount, order time and other information associated with the order, which is not limited here. The terminal device information may include information related to the terminal device such as the geographical location and device identifier of the terminal device making this payment, which is not limited here. Payment information may include payment payer information, payment payee information, payment amount, payment time and other payment-related information, which is not limited here. The payment payee information may include merchant name, merchant account and other information, and the payment payer information may include payer account, payer payment card information, payer identity and other information, which is not limited here.

The security verification request message includes security verification information. The security verification request message is used to instruct the security control system to perform security verification on a payment corresponding to the payment request message based on the security verification information. The security verification information may include at least part of the information sent by the SDK in the terminal device to the SDK server. The security verification information may also include the payment payer information pre-stored in the SDK server and indicated by the payment request message, etc., which is not limited here. For example, the security verification information may include one or more of the payment card number, the payer's login account, the mobile phone number associated with the payer's login account, the mobile phone number associated with the payment card, terminal device identifier, geographical location of the terminal device, payment amount, payment time, payment card, historical payment information of the payment card, etc. The security verification information may also include other information that may be used for security verification, which is not limited here.

In some embodiments, when the security verification request message includes a payment card number, the payment card number may be the default payment card number provided by the SDK in the terminal device. If the user switches the default payment card on the terminal device, that is, if the card number of the default payment card changes, the SDK will send a message including the new default payment card number to the SDK server, and the SDK server will be triggered to send a security verification request message including the new default payment card number to the security control system again. That is, if the user switches the default payment card on the payment details page displayed on the terminal device, the SDK server will re-send a security verification request message including the switched default payment card number to the security control system.

The security control system receives the security verification request message and performs security verification based on the security verification information in the security verification request message. Security verification may verify the legality of payment and the security of the login status of the payment terminal device. Specifically, it may be determined whether the security verification is passed by checking whether the security verification information satisfies the predetermined security decision standards. Safety decision standards may be configured according to specific application scenarios, needs, etc., which are not limited here. For example, the security verification information includes the terminal device identifier of this payment and the historical payment information of the payment card. The historical payment information of the payment card includes the terminal device identifier of the payment card in historical payments. If the terminal device identifier of this payment and the terminal device identifier of the payment card in the historical payments are consistent, the security verification passes; otherwise, the security verification fails. For another example, the security verification information includes the geographical location of the terminal device used for this payment, the payment time, and the historical payment information of the payment card, and the historical payment information of the payment card includes the geographical location and payment time of the terminal device used for the most recent payment by the payment card. If the time difference between the payment time of the payment card's most recent payment and the payment time of this payment is less than a pre-set time length, and if the distance between the geographical location of the terminal device for the payment card's most recent payment and the location of the terminal device for this payment is greater than a pre-set distance, the security verification fails; otherwise, the security verification passes. For another example, the security verification information includes the mobile phone number associated with the payer's login account and the mobile phone number associated with the payment card. If the mobile phone number associated with the payer's login account is consistent with the mobile phone number associated with the payment card, the security verification is passed; otherwise, the security verification fails.

In some embodiments, the security verification is determined to have failed when the security risk is very high, such as insufficient account balance, illegal payment, etc. When the security risk is medium or low, and when the security of the payment may be verified through a subsequent user verification, the security verification may be determined to have passed. For example, the security verification information includes the terminal device identifier of this payment and the historical payment information of the payment card. The historical payment information of the payment card includes the terminal device identifier of the payment card in historical payments. Since the user may change a terminal device, even if the terminal device identifier of this payment is inconsistent with the terminal device identifier of the payment card's historical payments, it may still be considered as passing the security verification, and in the subsequent process, user verification may be used to determine whether the user himself/herself is using the replaced terminal device to make the payment. For another example, the security verification information includes the payment amount of this payment and the payer's account balance, if the payment amount of this payment is less than or equal to the payer's account balance, the security verification is passed; otherwise, the security verification is not passed.

In some embodiments, when the SDK receives a payment request message and detects that the currently logged-in user account is not associated with a payment card, it may send a card binding prompt message to prompt the user to conduct a card binding process to bind the payment card. After binding the payment card, the SDK then sends a security verification request message to the security control system.

In Step S202, security verification result information sent by the security control system is received.

The security control system performs security verification based on the security verification information and may obtain security verification result information for this payment, i.e., the payment indicated by the payment request message. The security verification result information is used to indicate whether the security verification is passed. If the security verification result information indicates that the security verification has not passed, the SDK server may send an instruction message to the SDK in the terminal device, so that the SDK issues a pop-up message to suspend the payment.

In some embodiments, after the SDK server receives the security verification result information indicating that the security verification is passed, the SDK in the terminal device may call a pre-set query interface to transmit the payment information such as the payer information, order information such as the order number, and possible other information for this payment to the SDK server. The SDK server may further supplement other order information for this payment, such as the merchant number and other payment information related to the payment, and synchronize the payment information and order information to the host program server, so as to implement a synchronization of the information about this payment between the SDK server and the host program server.

In some embodiments, in the case where the SDK backend system includes the SDK backend subsystem and the payment code subsystem, after the SDK server in the SDK backend subsystem receives the security verification result information indicating that the security verification is passed, the SDK backend subsystem of the SDK server may call a pre-set query interface to transmit the payment information such as payer information, order number and other order information of this payment to the SDK server of the payment code subsystem. The SDK server of the payment code subsystem may further supplement other order information such as merchant number and other payment information related to payment, etc., for this payment, and synchronize the payment information and order information to the host program server to implement a synchronization of information about this payment between the SDK server in the SDK backend system and the host program server.

In Step S203, when the security verification result information indicates that the security verification is passed, a first notification message is sent to the SDK in the terminal device.

If the security verification result information indicates that the security verification is passed, then a user verification process of the owner of the host program may be carried out. A first notification message is used to instruct the SDK to notify the host program to display a user verification page to prompt the user to enter first user verification input information. The first user verification input information is used by the host program server to perform user verification to obtain user verification result information.

In response to the first notification message, the SDK in the terminal device may send a message to the host program for instructing the host program to display the user verification page. In response to this message, the host program causes the terminal device to display the user verification page. The user verification page may include a password filling area, a verification code filling area, a biometric collection area, etc. The method of user verification is not limited here. The information input by the user to the user verification page is the first user verification input information. The host program may send the first user verification input information to the host program server. The host program server may perform user verification based on the received first user verification input information, and obtain user verification result information. User verification is used to verify the identity of the user. Passed user verification means that the user performing the payment operation is a legal user. For example, the first user verification input information is a password, and the host program server verifies whether the first user verification input information is consistent with the password registered by the user in the host program server. If the first user verification input information and the password registered by the user in the host program server are consistent, the user verification passes; otherwise, the user verification fails. For another example, the first user verification input information is a face image, and the host program server verifies whether the first user verification input information and the face image pre-stored by the user in the host program server belong to a same user. If the first user verification input information and the face image pre-stored by the user in the host program server belong to the same user, the user verification is passed; otherwise, the user verification fails.

User verification result information is used to indicate whether the user verification is passed. The host program server may feed back the user verification result information to the host program and SDK server respectively. The host program will also transmit the user verification result to the SDK, so that both the owner of the SDK and the owner of the host program may know whether the user verification is passed.

In some embodiments, when the host program displays the user verification page, the SDK may add event tracking function associated with the action of displaying the user verification page, so as to facilitate subsequent analysis and troubleshooting of the execution of the process of displaying the user verification page by the host program.

In Step S204, when user verification result information indicates that the user verification is passed, a payment request is initiated to complete the payment.

The user verification result information indicates that the user has passed the verification, indicating that the user's identity is highly secure and may initiate a payment request to the payer's account management system and make the payment normally. If the user verification result information indicates that the user verification has not passed, the payment may be suspended.

In some embodiments, since the user verification result information may be stolen or tampered with during transmission, in order to further ensure payment security, consistency verification standards may be used to verify the security of the user verification result information during the transmission. When the user verification result information satisfies the consistency verification standards, the payment request is initiated. The consistency verification standards are used to determine whether the user verification result information is safe and valid during the transmission process. The user verification result information satisfies the consistency verification standards, which means that the user verification result information is safe and valid during the transmission process. A payment request may be initiated to the payer's account management system and payment may be made normally. Alternatively, the SDK server may send a request to the payer's account management system through the host program server. The payer's account management system then initiates a payment request and makes the payment normally. If the user verification result information does not meet the consistency verification standards, which means that the user verification result information is not safe and valid during the transmission process, the payment may then be suspended.

In some embodiments, the consistency verification standards may include: the first user verification result information is consistent with the second user verification result information. The first user verification result information is the user verification result information transmitted by the host program server to the SDK through the host program. The second user verification result information is the user verification result information obtained from the host program server. When the first user verification result information is consistent with the second user verification result information, it means that the user verification result information is safe and valid during the transmission process. When the first user verification result information is inconsistent with the second user verification result information, it means the user verification result information is not safe and valid during transmission.

After the payment is successful, the SDK server may obtain payment result information, which indicates whether the payment was successful. The SDK server may transmit the payment result information to the SDK, merchant system, etc., to display the result of successful payment to the user, merchant, etc.

In the above payment process, after the user is verified, since the transmission of the user verification result information, payment, and payment result information all take a certain amount of time, the terminal device will not immediately display the payment completion page. In this case, the SDK may control the terminal device to display a payment in progress sign, such as an image containing the word "loading", and stop displaying the payment in progress sign when the terminal device displays a payment completion page.

In the embodiments of the present disclosure, the SDK server responds to the payment request message and sends a security verification request message to the security control system to request the security control system to perform security verification on this payment to complete the security verification required by the SDK owner. When the security verification is passed, the SDK server sends a message to the SDK of the terminal device to instruct the SDK to notify the host program to display a user verification page, so that the SDK may trigger the host program to actively initiate user verification to complete the user identity security verification required by the host program owner. During the payment process, two-way verification is realized between the SDK owner and the host program owner, which improves the security of the payment and meets the security control needs of the SDK owner and the host program owner.

In some embodiments, when the SDK server initiates a payment request to the payer's account management system through the host program server, the SDK server may provide first payment policy information of the SDK owner.

The first payment policy information may include the SDK owner's promotion information, payment activity information, etc., which may be used to calculate the amount of the payment indicated by the payment request message. The host program server may provide second payment policy information of the host program owner. The second payment policy information may include promotion information, payment activity information, etc., of the host program owner, which may be used to calculate the amount of the payment indicated by the payment request message.

In some embodiments, after receiving the payment request message, the SDK server may also directly query the host program server or query the host program server through the payment policy system for the payment policy information, such as promotion information, payment activity information, etc.

In the above embodiments, the information exchanged between the SDK and the host program is encrypted information, and the SDK needs to encrypt and decrypt the information. Correspondingly, the SDK server stores keys used to encrypt and decrypt information exchanged between the SDK and the host program.

Figure 3:
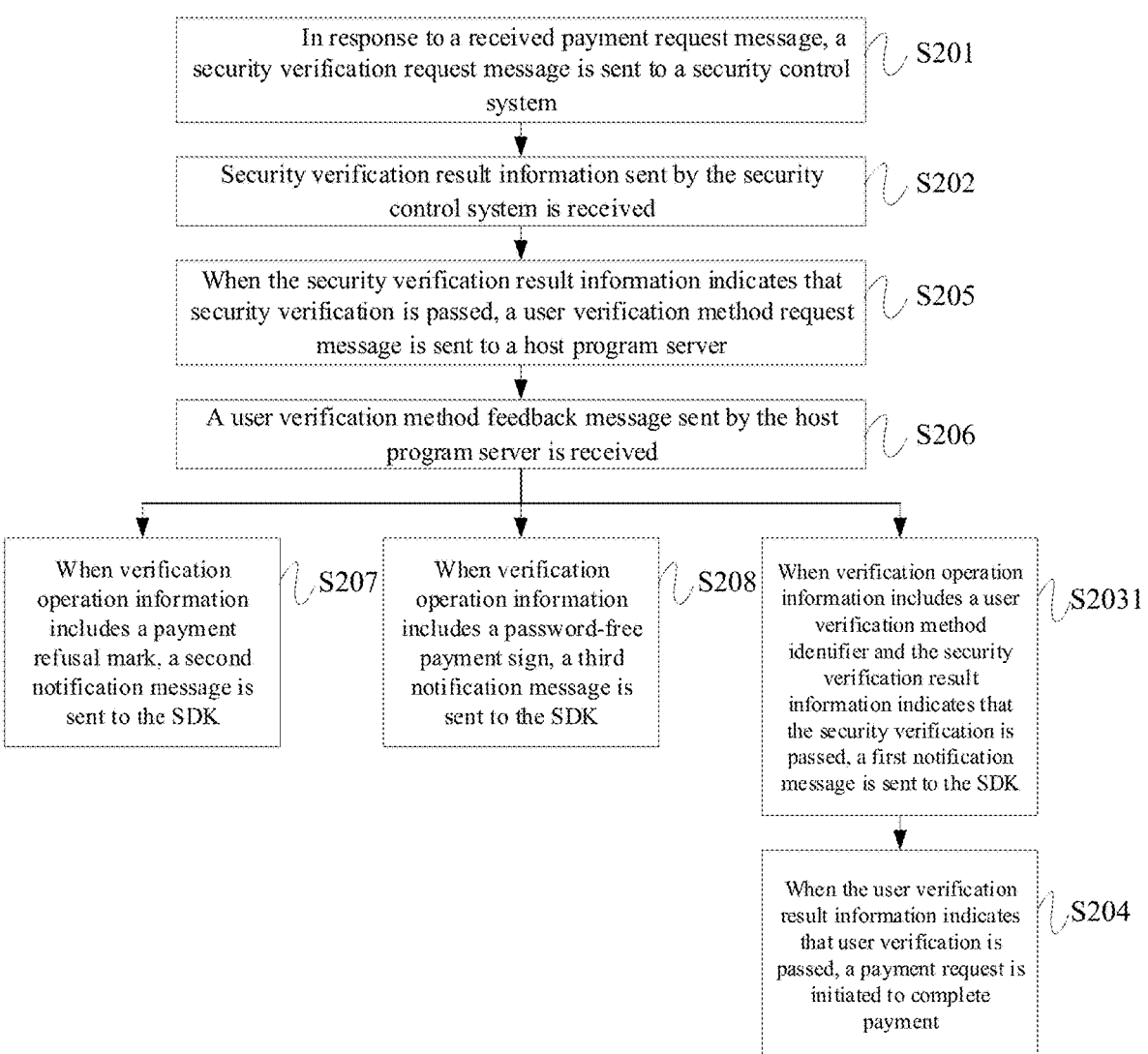
FIG. 3 is a flow chart of another payment method in accordance with an embodiment of the first aspect of the present disclosure.

In some embodiments, the SDK server may request a user verification method from the host program server, and transmit feedback from the host program server to the SDK, so that the SDK performs corresponding operations. FIG. 3 is a flow chart of another payment method in accordance with an embodiment of the first aspect of the present disclosure. The difference between FIG. 3 and FIG. 2 is that the payment method shown in FIG. 3 may also include Steps S205 to S208, and Step S203 in FIG. 2 may be specifically refined into Step S2031 in FIG. 3.

In Step S205, when the security verification result information indicates that the security verification is passed, a user verification method request message is sent to the host program server.

The user verification method request message is used to request a user verification method from the host program server, and may include one or more of the order information, terminal device information, and payment information corresponding to the payment indicated by the payment request message. For the specific contents of order information, terminal device information and payment information, refer to the relevant descriptions in the above embodiments, which will not be repeated here.

The host program server may determine the verification operation information based on the information in the user verification method request message. The verification operation information is used to indicate whether to perform user verification and the method of user verification. The host program server may store determination standards for determining whether to perform user verification and the method of user verification, and may determine whether to perform user verification and the method of user verification based on whether the information in the user verification method request message satisfies the reference standards. The determination standards may be configured according to payment scenarios, needs, etc., which are not limited here. For example, the user verification method request message may include payment information, and the payment information may include the payment amount. The determination standards may include a correspondence between the payment amount range and whether to perform user verification and the user verification method. For example, the determination standards may include: when the payment amount is less than 100 yuan, user verification is not required; when the payment amount is within the range of 100 yuan to 500 yuan, user verification is required and the user verification method is password verification; when the payment amount is within the range of 500 yuan to 1,000 yuan, user verification is required and the user verification method is verification code verification; when the payment amount is greater than 1,000 yuan, user verification is required, and the user verification method is biometric verification. For another example, the user verification method request message may include order information and payment information. The order information includes the order ID and the user account that placed the order, and the payment information includes the payer's login account. The determination standards may include: when the user's account that placed the order is inconsistent with the payer's login account, user verification is required, and the user verification method is biometric verification; when the order user account is consistent with the payer's login account, user verification is required, and the user verification method is password verification.

After the host program server determines the verification operation information, the host program server may send a user verification method feedback message to the SDK server. The user verification method feedback message includes verification operation information.

In Step S206, a user verification method feedback message sent by the host program server is received.

In Step S207, when the verification operation information includes a payment refusal mark, a second notification message is sent to the SDK.

The payment refusal mark indicates that user verification is not required and payment is stopped. In response to the user verification method feedback message, the SDK server sends a second notification message to the SDK in the terminal device. The second notification message is used to instruct the SDK to issue a payment refusal prompt message. In response to the second notification message, the SDK may issue a prompt message to remind the user that there is a payment risk. For example, the prompt message causes the terminal device to display text such as "limited by the host program risk." In some embodiments, the user verification method feedback message may also include the reason for refusal of payment. Correspondingly, the second notification message may also include the reason for refusal of payment. The prompt message sent by the SDK in response to the second notification message may include the reason for refusal of payment. The terminal device may display the reason for refusal of payment to inform the user. Reasons for payment refusal may include SDK anomaly, host program server anomaly, and other reasons that cause the user verification method to indicate a failure.

In Step S208, when the verification operation information includes a password-free payment sign, a third notification message is sent to the SDK.

The password-free payment sign indicates that user verification is not required and the payment process may be continued. In response to the user verification method feedback message, the SDK server sends a third notification message to the SDK in the terminal device. The third notification message is used to instruct the SDK to issue a password-free payment prompt message. The password-free payment prompt message may remind the user that the payment is a password-free payment.

In Step S2031, when the verification operation information includes a user verification method identifier and the security verification result information indicates that the security verification is passed, a first notification message is sent to the SDK.

The first notification message includes a user verification method identifier. The user verification method identifier is used to indicate the method of user verification. The first notification message is used to instruct the SDK to notify the host program to display a user verification page that matches the user verification method identifier, so as to prompt the user to enter first user verification input information that matches the user verification method identifier. That is, in response to the first notification message, the SDK may send an instruction message including the user verification method identifier to the host program. According to the user verification method identifier, the host program displays a user verification page corresponding to the user verification method indicated by the user verification method identifier. Correspondingly, the first user verification input information input by the user also corresponds to the user verification method indicated by the user verification method identifier.

Here are some examples. When the user verification method is identified as 01, the user verification method is password verification, the user verification page displayed by the host program is a password verification page, and the first user verification input information that the user needs to enter is a password. When the user verification method is identified as 10, the user verification method is verification code verification, the user verification page displayed by the host program is a verification code verification page, and the first user verification input information that the user needs to enter is the verification code. When the user verification method is identified as 11, the user verification method is biometric verification, the user verification page displayed by the host program is a biometric verification page, and the first user verification input information that the user needs to input is biometric information.

In some embodiments, the payment request message, the security verification request message, and the security verification result information may include a target host program identifier. The target host program identifier includes a payment host program identifier corresponding to the payment request message, that is, the target host program identifier may indicate a payment-related host program corresponding to the payment request message.

The SDK server includes a pre-set first corresponding relationship. The first corresponding relationship includes a relationship between the host program identifiers and the user verification callers. A host program identifier is used to identify a host program. A user verification caller is used to indicate a subject that displays a user verification page. The user verification caller includes the SDK or host program in the terminal device. After receiving the security verification result information, the SDK server may determine a target user verification caller corresponding to a target host program identifier according to the target host program identifier and the first corresponding relationship. The target user verification caller is the user verification caller corresponding to the target host program identifier in the first corresponding relationship.

When the target user verification caller is the host program, the SDK server sends a first notification message to the SDK. When the target user verification caller is the SDK, the SDK server sends a fourth notification message to the SDK. The fourth notification message is used to instruct the SDK to display a user verification page to prompt the user to enter second user verification input information. The second user verification input information is used by the SDK server to perform user verification to obtain user verification result information. In response to the fourth notification message, the SDK in the terminal device may directly display the user verification page. Correspondingly, the user verification is performed by the SDK server. The SDK in the terminal device may send the second user verification input information to the SDK server. The SDK server performs user verification based on the second user verification input information and obtains user verification result information. For the specific content of user verification, refer to the relevant descriptions of user verification performed by the host program server in the above embodiments, which will not be described again here.

Through the setting of the first corresponding relationship, the subject setting of user verification in the terminal device may be made more flexible and selective.

In some embodiments, a payment is initiated by a merchant system or through a merchant program installed in the terminal device. Before the SDK server receives the payment request message, the order-related information needs to be communicated between the merchant system and the SDK and between the SDK and the SDK server. FIG. 4 is a flow chart of yet another payment method in accordance with an embodiment of the first aspect of the present disclosure. The difference between FIG. 4 and FIG. 2 is that the payment method shown in FIG. 4 may also include Steps S209 to S211.

In Step S209, an order identifier is generated in response to an order request message sent by a merchant system.

After the user places an order to generate an order, the merchant system may send an order request message to the SDK server to request an identifier that may identify the order, that is, an order identifier. The order identifier generated by the SDK server may specifically be an order serial number.

In Step S210, an order feedback message is sent to the merchant system, so that the merchant system sends an SDK call request message to the SDK.

The SDK server may generate an order feedback message, which includes an order identifier. The SDK server sends the order feedback message to the merchant system, and the order feedback message includes the order identifier. After receiving the order feedback message, the merchant system may send an SDK call request message to the SDK of the terminal device. An SDK call request includes the order identifier. The SDK call request message is used to request to call the SDK in the terminal device. During the initialization process, the SDK in the terminal device may collect information such as the geographical location of the terminal device and the terminal device identifier.

In Step S211, in response to a first order query message sent by the SDK, a first query feedback message is sent to the SDK.

The SDK may send a first order query message to the SDK server, so that the SDK server may query the order information corresponding to an order identifier through the order identifier. The first order query message includes the order identifier. After the SDK server finds the order information corresponding to the order identifier, the SDK server feeds back the order information corresponding to the order identifier to the SDK through a first query feedback message. The first query feedback message includes order information corresponding to the order identifier. After receiving the first query feedback message, the SDK may send a payment request message to the SDK server.

In some embodiments, the merchant may specify a specific payer for payment, and the order request message includes the identity information of the specified payer, that is, the specific payer is specified through the order request message. The payment request message sent by the SDK to the SDK server includes payment payer identity information such as user login account. When the specified payer identity information is inconsistent with the payment payer identity information indicated in the payment request message, the SDK server may send a payment suspension notification message to the SDK, which causes the SDK to issue a payment notification message. The payment notification message may notify the user to switch the user's login account and pay again. The payment notification message may also notify the user the reason for the suspension of payment. For example, the payment notification message includes the words like "the login account information does not match the information specified by the merchant and the payment cannot be made temporarily" displayed on the terminal device.

Figure 5:
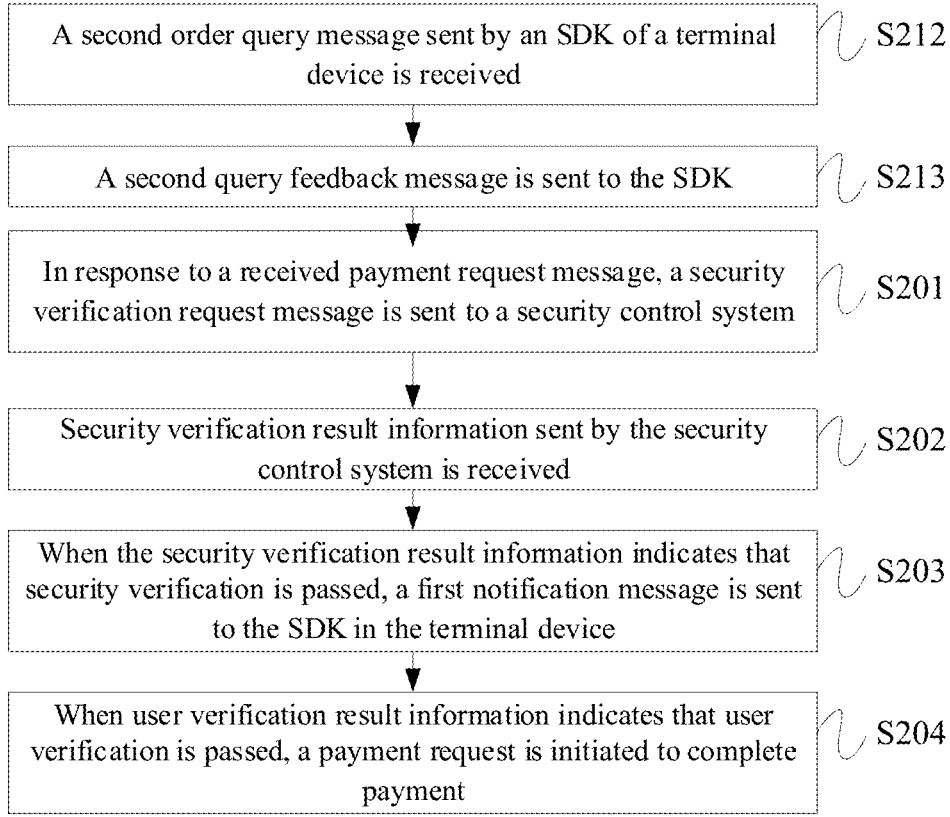
FIG. 5 is a flow chart of yet another payment method in accordance with an embodiment of the first aspect of the present disclosure.

In some embodiments, the payment may be a payment initiated by a user using a terminal device to scan another person's payment code. Before the SDK server receives the payment request message, the SDK and the SDK server still need to communicate with each other regarding order-related information. FIG. 5 is a flow chart of yet another payment method in accordance with an embodiment of the first aspect of the present disclosure. The difference between FIG. 5 and FIG. 2 is that the payment method shown in FIG. 5 may also include Step S212 and Step S213.

In Step S212, a second order query message sent by an SDK of a terminal device is received.

The terminal device scans a payment code to obtain first code information. The first code information is the code information read from the payment code. The SDK of the terminal device may send a second order query message to the SDK server. The second order query message is used to request the SDK server to query the order information corresponding to the first code information. The second order query message includes the first code information obtained by scanning the payment code by the terminal device.

In Step S213, a second query feedback message is sent to the SDK.

The SDK server searches for the order information corresponding to the first code information based on the first code information. After finding the order information corresponding to the first code information, the SDK server may generate a second query feedback message and send the second query feedback message to the SDK. The second query feedback message includes order information corresponding to the first code information.

After receiving the second query feedback message, the SDK may determine the payment amount based on the user's input, generate a payment request message, and send the payment request message to the SDK server. After receiving the payment request message, the SDK server may determine whether the payment card indicated in the payment request message is available, and if the payment card is available, send a security verification request message to the security control system.

In some embodiments, the payment may be a payment initiated by a user using the terminal device to display the payment code and others using a payment acceptance terminal to scan the payment code. Before the SDK server receives the payment request message, the SDK may apply for a payment code from the SDK server. FIG. 6 is a flow chart of yet another payment method in accordance with an embodiment of the first aspect of the present disclosure. The difference between FIG. 6 and FIG. 2 is that the payment method shown in FIG. 6 may also include Step S214.

In Step S214, in response to a received payment code application message, a payment code feedback message is sent to the SDK.

The payment code application message is sent by the SDK. That is, the SDK in the terminal device may send a payment code application message to the SDK server, and the payment code application message is used to apply for a payment code from the SDK server. The SDK server assigns a payment code to the payment code application message and feeds the payment code back to the SDK through the payment code feedback message. The payment code feedback message includes the payment code.

In some embodiments, the SDK backend system includes an SDK backend subsystem and a payment code subsystem. The SDK may send the payment code application message to the SDK server in the SDK backend subsystem. The SDK server in the SDK backend subsystem forwards the payment code application message to the SDK server in the payment code subsystem. The SDK server in the payment code subsystem assigns a payment code for the payment code application message, and sends a payment code feedback message to the SDK server in the SDK backend subsystem. The SDK server in the SDK backend subsystem forwards the payment code feedback message to the SDK.

A payment request message is generated by the payment acceptance device based on the scanned payment code. After receiving the payment code feedback message, the SDK may display the payment code when making payment. The payment acceptance device scans the payment code and obtains second code information. The second code information is the code information read from the payment code. The payment acceptance device may generate a payment request message based on the second code information, and send the payment request message to the SDK server.

A second aspect of the present disclosure provides a payment method, which is applied to a terminal device, that is, the payment method may be executed by the terminal device. The terminal device has an SDK and a host program. FIG. 7 is a flow chart of a payment method in accordance with an embodiment of the second aspect of the present disclosure. As shown in FIG. 7, the payment method may include Steps S301 to S304.

In Step S301, a first notification message sent by an SDK server is obtained through an SDK.

The first notification message is sent by the SDK server based on the security verification result information indicating that the security verification is passed. The security verification result information is obtained by the security control system performing security verification on the payment corresponding to the payment request message based on the security verification information in the security verification request message. The security verification request message is sent by the SDK server in response to the received payment request message.

In Step S302, in response to the first notification message, a host program is notified through the SDK to display a user verification page to prompt a user to enter first user verification input information.

In Step S303, the first user verification input information is fed back to a host program server through the host program.

The first user verification input information is used by the host program server to perform user verification to obtain user verification result information.

In Step S304, user verification result information obtained from the host program server through the host program is sent to the SDK server through the SDK, so that the SDK server initiates a payment request to complete a payment when the user verification result information indicates that a user verification is passed.

In some embodiments, the user verification result information is also used to enable the SDK server to initiate a payment request when the user verification result information satisfies the consistency verification standards.

In some embodiments, the consistency verification standards include: the first user verification result information is consistent with the second user verification result information, where the first user verification result information is the user verification result information transmitted to the SDK by the host program server through the host program. The second user verification result information is the user verification result information obtained from the host program server.

For the specific contents of the above Steps S301 to S304, refer to the relevant descriptions in the above embodiments, which will not be described again here.

In the embodiments of the present disclosure, the SDK server responds to the payment request message and sends a security verification request message to the security control system to request the security control system to perform security verification on this payment to complete the security verification requirements required by the SDK owner. When the security verification is passed, the SDK in the terminal device receives a message sent by the SDK server instructing the SDK to notify the host program to display the user verification page. The SDK responds to the message and triggers the host program to actively initiate user verification to complete the user identity security verification required by the program owner. During the payment process, two-way verification is realized between the SDK owner and the host program owner, which improves the security of the payment and meets the security control needs of the SDK owner and the host program owner.

Figure 8:
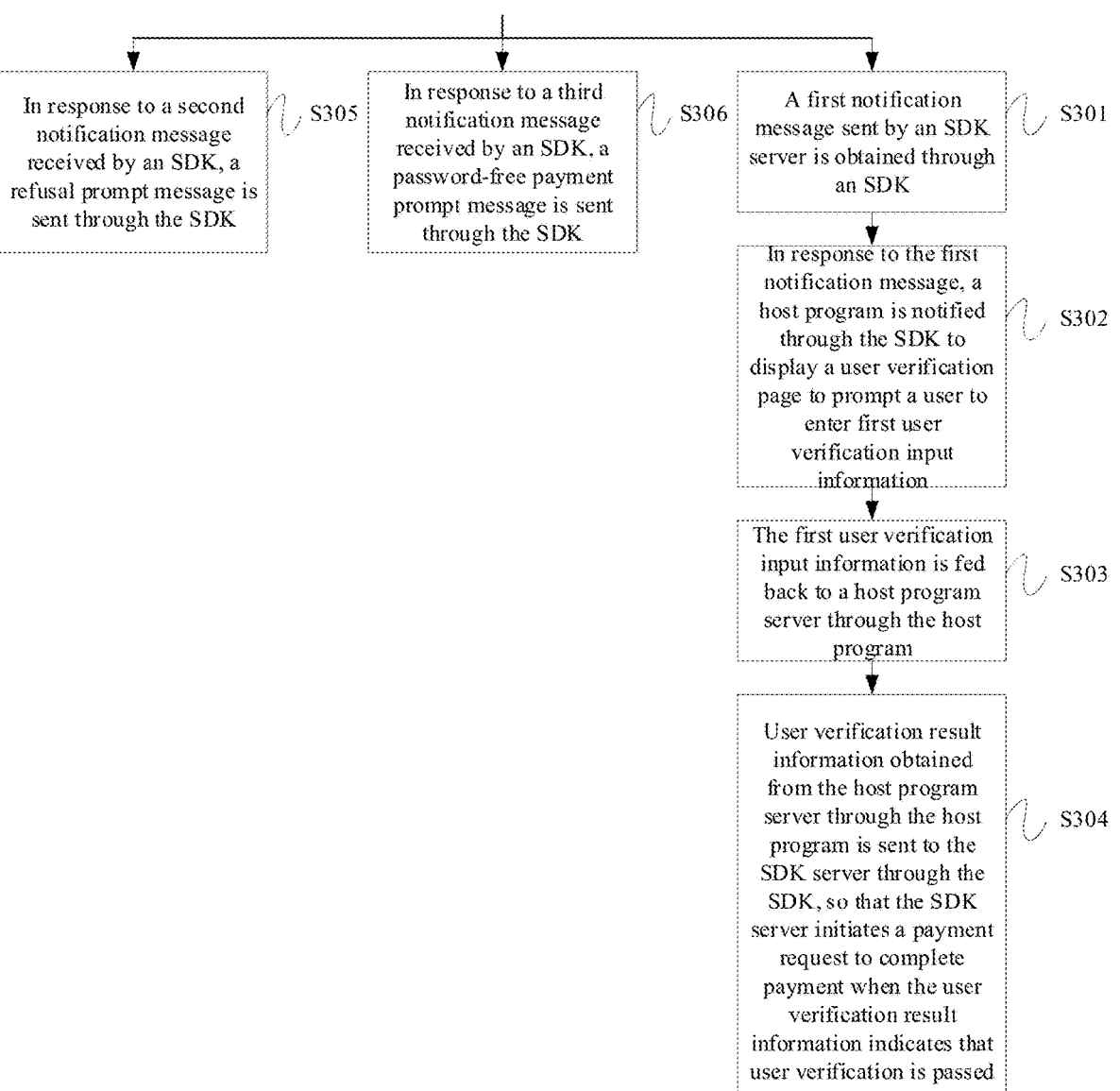
FIG. 8 is a flow chart of another payment method in accordance with an embodiment of the second aspect of the present disclosure.

In some embodiments, the SDK server may request the user verification method from the host program server, and the SDK may obtain feedback from the host program server through the SDK server and perform corresponding operations. FIG. 8 is a flow chart of another payment method in accordance with an embodiment of the second aspect of the present disclosure. The difference between FIG. 8 and FIG. 7 is that the payment method shown in FIG. 8 may also include Step S305 and Step S306.

In Step S305, in response to a second notification message received by the SDK, a refusal prompt message is sent through the SDK.

The second notification message is sent by the SDK server when the verification operation information includes a payment refusal mark.

In Step S306, in response to a third notification message received by the SDK, a password-free payment prompt message is sent through the SDK.

The third notification message is sent by the SDK server after verifying that the operation information includes a password-free payment sign.

A user verification method feedback message includes verification operation information. The user verification method feedback message is sent by the host server in response to a user verification method request message. The user verification method request message is sent by the SDK server to the host program server when the security verification result information indicates that the security verification is passed. The user verification method request message includes one or more of the order information, terminal device information, and payment information corresponding to the payment indicated by the payment request message.

In some embodiments, a first notification message is sent by the SDK server when the verification operation information includes a user verification method identifier. The first notification message includes a user verification method identifier, which is used to instruct the SDK to notify the host program to display a user verification page that matches the user verification method identifier, so as to prompt the user to enter first user verification input information that matches the user verification method identifier.

For the specific contents of the above Steps S305 and S306, refer to the relevant descriptions in the above embodiments, which will not be described again here.

In some embodiments, the security verification result information includes a target host program identifier. The target host program identifier includes a payment host program identifier corresponding to the payment request message. A first notification message is sent by the SDK server when a target user verifies that the caller is the host program. A target user verification caller is a user verification caller that matches the target host program identifier in the first corresponding relationship, where the target host program identifier includes a host program identifier of the payment corresponding to the payment request message. The first corresponding relationship includes a relationship between host program identifiers and user verification callers.

In some embodiments, when the target user verifies that the caller is the SDK, the terminal device obtains a fourth notification message sent by the SDK server through the SDK. The fourth notification message is sent by the SDK server when the target user verifies that the caller is the SDK. In response to the fourth notification message, the terminal device calls the SDK to display a user verification page to prompt the user to enter the second user verification input information. The terminal device feeds back the second user verification input information to the SDK server through the SDK. The second user verification input information is used by the SDK server to perform user verification to obtain user verification result information.

In some embodiments, the payment is initiated by a merchant system or through a merchant program installed in the terminal device. Before the SDK server receives the payment request message, the order-related information needs to be communicated between the merchant system and the SDK, and between the SDK and the SDK. FIG. 9 is a flow chart of yet another payment method in accordance with an embodiment of the second aspect of the present disclosure. The difference between FIG. 9 and FIG. 7 is that the payment method shown in FIG. 9 may also include Steps S307 to S309.

In Step S307, an SDK call request message is received through an SDK, where the SDK call request message is generated by a merchant system in response to an order feedback message.

The order feedback message and the SDK call request message include the order identifier. The order identifier is generated by the SDK server in response to the order request message sent by the merchant system.

In Step S308, in response to the SDK call request message, a first order query message is sent to an SDK server through the SDK.

In Step S309, a first query feedback message sent by the SDK server in response to the first order query message is received through the SDK.

The first query feedback message includes order information corresponding to the order identifier.

In some embodiments, the order request message includes specified payer identity information. In response to a payment suspension notification message received through the SDK, the terminal device may send a payment notification message through the SDK. The payment suspension notification message is sent by the SDK server when the specified payer identity information is inconsistent with the payer identity information of the payment indicated by the payment request message.

For the specific contents of the above-mentioned Steps S307 to Step S309, refer to the relevant descriptions in the above embodiments, which will not be described again here.

In some embodiments, the payment may be a payment initiated by a user using a terminal device to scan another person's payment code. Before the SDK server receives the payment request message, the SDK and the SDK server still need to communicate with each other regarding order-related information. FIG. 10 is a flow chart of yet another payment method in accordance with an embodiment of the second aspect of the present disclosure. The difference between FIG. 10 and FIG. 7 is that the payment method shown in FIG. 10 may also include Steps S310 to S312.

In step 310, a payment code is scanned to obtain first code information.

In step 311, a second order query message is sent to an SDK server through an SDK.

The second order inquiry message includes the first code information.

In step 312, a second query feedback message sent by the SDK server is received through the SDK.

The second query feedback message includes order information corresponding to the first code information.

For the specific content of the above-mentioned Steps S310 to Step S312, refer to the relevant descriptions in the above embodiments, which will not be described again here.

In some embodiments, the payment may be a payment initiated by a user using a terminal device to display a payment code and others using a payment acceptance terminal to scan the payment code. Before the SDK server receives the payment request message, the SDK may apply for a payment code from the SDK server. FIG. 11 is a flow chart of yet another payment method in accordance with an embodiment of the second aspect of the present disclosure. The difference between FIG. 11 and FIG. 7 is that the payment method shown in FIG. 11 may also include Steps S313 to S315.

In Step S313, a payment code application message is sent to an SDK server through an SDK.

In Step S314, a payment code feedback message sent by the SDK server is received through the SDK.

The payment code feedback message includes the payment code.

In Step S315, a payment code is displayed.

The payment code is used for scanning by a payment acceptance device to generate a payment request message.

For the specific contents of the above Steps S313 to S315, refer to the relevant descriptions in the above embodiments, which will not be described again here.

The third aspect of the present disclosure provides a payment method, which is applied to the host program server, that is, the payment method may be executed by the host program server. FIG. 12 is a flow chart of a payment method in accordance with an embodiment of the third aspect of the present disclosure. As shown in FIG. 12, the payment method may include Steps S401 to S403.

In Step S401, first user verification input information fed back by a terminal device through a host program is received.

The first user verification input information is obtained after the SDK notifies the host program to display the user verification page in response to the first notification message.

The first notification message is sent by the SDK server based on the security verification result information indicating that the security verification is passed. The security verification result information is obtained by the security control system performing security verification on the payment corresponding to the payment request message based on the security verification information in the security verification request message. The security verification request message is sent by the SDK server in response to the received payment request message.

In Step S402, user verification is performed based on the first user verification input information to obtain user verification result information.

In Step S403, the user verification result information is sent to the host program in the terminal device, and the user verification result information is transmitted to the SDK through the host program, so that the SDK sends the user verification result information to the SDK server. If the user verification result information indicates that the user verification is passed, the SDK server initiates a payment request to complete the payment.

In some embodiments, after executing Step S403, the host program server may also send user verification result information to the SDK server, so that when the user verification result information indicates that the user verification is passed and the user verification result information satisfies the consistency verification standards, the SDK server may initiate a payment request to complete the payment.

In some embodiments, the consistency verification standards include: the first user verification result information is consistent with the second user verification result information. The first user verification result information is the user verification result information transmitted by the host program server to the SDK through the host program, and the second user verification result information is the user verification result information obtained from the host program server.

For the specific contents of the above-mentioned Steps S401 to Step S403, refer to the relevant descriptions in the above embodiments, which will not be described again here.

In the embodiments of the present disclosure, the SDK server responds to a payment request message and sends a security verification request message to the security control system to request the security control system to perform security verification on this payment to complete the security verification required by the SDK owner. When the security verification is passed, the SDK server sends a message to the SDK of the terminal device instructing the SDK to notify the host program to display a user verification page, so that the SDK may trigger the host program to actively initiate user verification. The terminal device may receive the first user verification input information input by the user, and send the first user verification input information to the host program server. The host program server may complete the user identity security verification required by the host program owner. During the payment process, two-way verification is realized between the SDK owner and the host program owner, which improves the security of the payment and meets the security control needs of the SDK owner and the host program owner.

In the above embodiments, the host program server stores a key for encrypting and decrypting information exchanged between the host program and the SDK. For details, refer to the relevant descriptions in the above embodiments, which will not be described again here.

In some embodiments, the host program server may accept a request from the SDK server and provide a user verification method to the SDK server. The SDK may obtain feedback from the host program server through the SDK server and perform the corresponding operation. FIG. 13 is a flow chart of another payment method in accordance with an embodiment of the third aspect of the present disclosure. The difference between FIG. 13 and FIG. 12 is that the payment method shown in FIG. 13 may also include Step S404 and Step S405.

In Step S404, a user verification method request message sent by the SDK server is received, when security verification result information indicates that security verification is passed.

The user verification method request message includes one or more of the order information, terminal device information, and payment information corresponding to the payment indicated by the payment request message.

In Step S405, a user verification method feedback message is sent to the SDK server according to the user verification method request message.

The user verification method feedback message includes verification operation information.

When the verification operation information includes a payment refusal identifier, the SDK server sends a second notification message to the SDK, where the second notification message is used to instruct the SDK to send a payment refusal prompt message. When the verification operation information includes a password-free payment sign, the SDK server sends a third notification message to the SDK, where the third notification message is used to instruct the SDK to send a password-free payment prompt message.

In some embodiments, a first notification message is sent by the SDK server when the verification operation information includes a user verification method identifier. The first notification message includes a user verification method identifier, which is used to instruct the SDK to notify the host program to display a user verification page that matches the user verification method identifier, so as to prompt the user to enter first user verification input information that matches the user verification method identifier.

For the specific contents of the above Steps S404 and S405, refer to the relevant descriptions in the above embodiments, which will not be described again here.

In some embodiments, the security verification result information includes a target host program identifier. The target host program identifier includes a payment host program identifier corresponding to the payment request message. A first notification message is sent by the SDK server when a target user verifies that the caller is the host program. The target user verification caller is a user verification caller that matches the target host program identifier in the first corresponding relationship. The target host program identifier includes the payment host program identifier corresponding to the payment request message. The first corresponding relationship includes a relationship between host program identifiers and user verification callers.

For ease of explanation, the following three scenarios are taken as examples: a payment is initiated by a merchant system or through a merchant program installed in a terminal device, a payment is initiated by a terminal device scanning someone else's payment code, and a payment is initiated by a payment acceptance terminal scanning the payment code. The interaction of the payment process between a terminal device, system, and server is explained.

Figure 14:
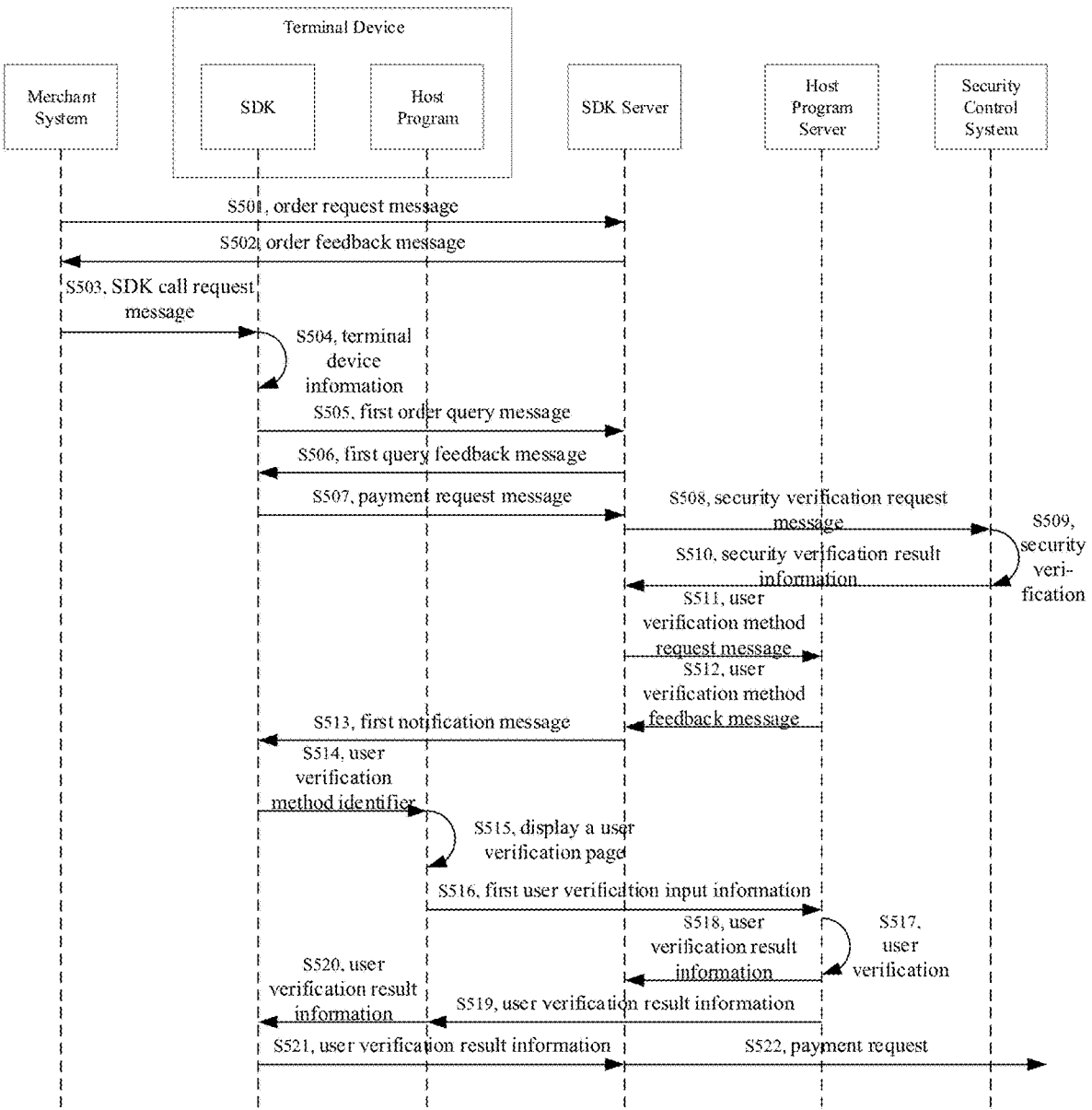
FIG. 14 is a flow chart of an example of a payment process in accordance with an embodiment of the present disclosure.

In this scenario, a payment is initiated by a merchant system or through a merchant program installed in a terminal device. FIG. 14 is a flow chart of an example of a payment process in accordance with an embodiment of the present disclosure. The terminal devices include an SDK and a host program. As shown in FIG. 14, the payment process includes Steps S501 to S522.

In Step S501, after a user places an order, a merchant system sends an order request message to an SDK server.

In Step S502, the SDK server responds to the order request message and sends an order feedback message to the merchant system, where the order feedback message may include an order identifier generated by the SDK server.

In Step S503, the merchant system sends an SDK call request message to the SDK in the terminal device.

In Step S504, the SDK collects terminal device information.

In Step S505, the SDK sends a first order query message to the SDK server.

In Step S506, the SDK server feeds back a first query feedback message to the SDK.

In Step S507, the SDK sends a payment request message to the SDK server.

In Step S508, the SDK server sends a security verification request message to the security control system.

In Step S509, the security control system performs security verification on a payment indicated by the payment request message.

In Step S510, the security control system feeds back security verification result information to the SDK server.

In Step S511, when the security verification result information indicates that the security verification is passed, the SDK server sends a user verification method request message to the host program server.

In Step S512, the host program server responds to the user verification method request message and sends a user verification method feedback message to the SDK server, where the user verification method feedback message includes a user verification method identifier.

In Step S513, the SDK server sends a first notification message to the SDK, where the first notification message includes the user verification method identifier.

In Step S514, the SDK transmits the user verification method identifier to the host program.

In Step S515, the host program is triggered to display a user verification page that matches the user verification method identifier.

In Step S516, the host program receives first user verification input information input by the user, and sends the first user verification input information to the host program server.

In Step S517, the host program server performs user verification based on the first user verification input information and obtains user verification result information.

In Step S518, the SDK server obtains the user verification result information from the host program server. For ease of explanation, the user verification result information obtained directly by the SDK server from the host server is called second user verification result information.

In Step S519, the host program server sends the user verification result information to the host program.

In Step S520, the host program feeds back the user verification result information to the SDK.

In Step S521, the SDK feeds back the user verification result information to the SDK server. For ease of explanation, the user verification result information obtained by the SDK server from the SDK is called first user verification result information.

In Step S522, when the first user verification result information and the second user verification result information are consistent, the SDK server initiates a payment request to complete the payment.

For the specific contents of the above-mentioned Steps S501 to Step S522, refer to the relevant descriptions in the above embodiments, which will not be described again here.

Figure 15:
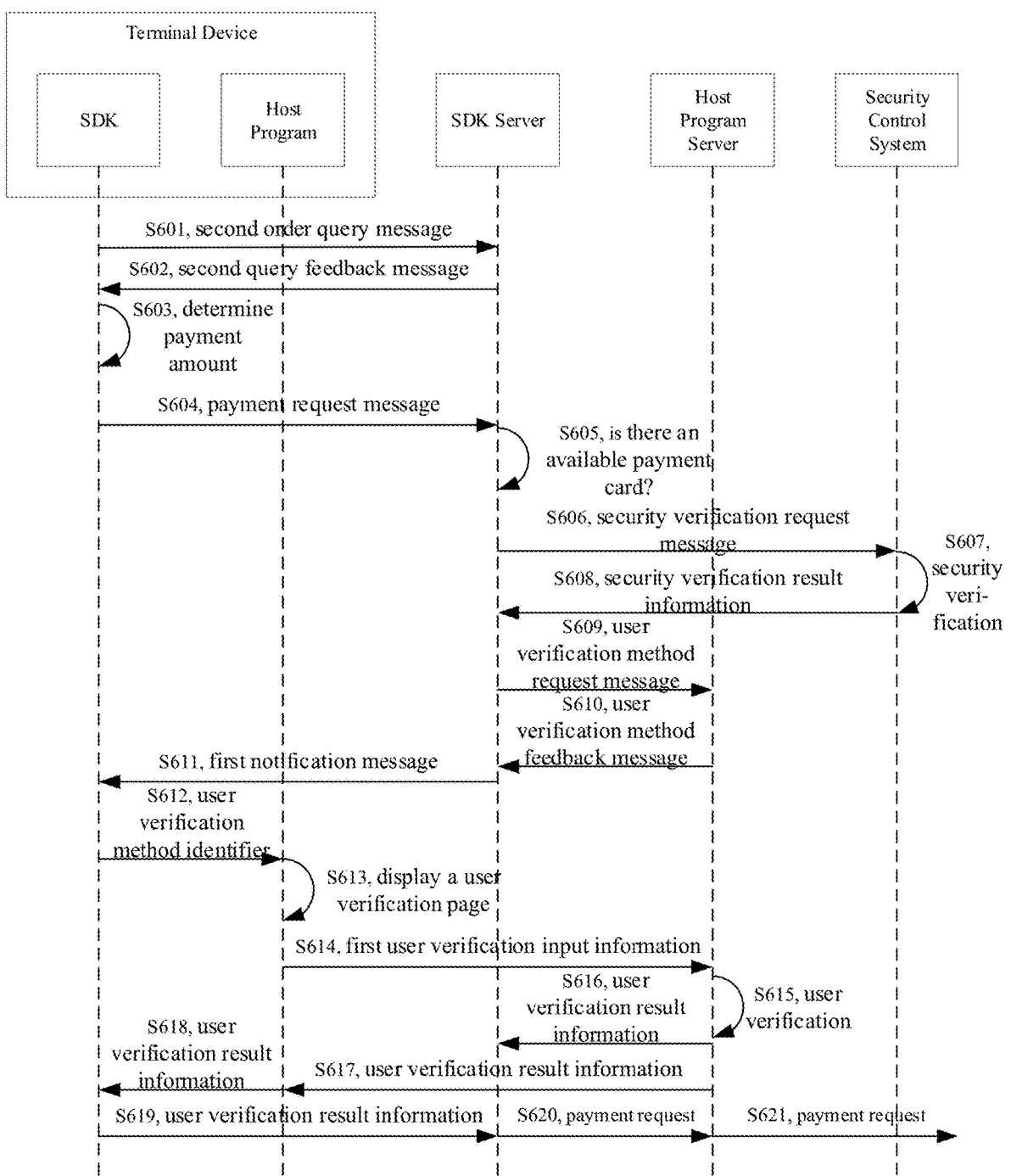
FIG. 15 is a flow chart of another example of a payment process in accordance with an embodiment of the present disclosure.

In this scenario, a payment is initiated by a terminal device scanning someone else's payment code. FIG. 15 is a flow chart of another example of a payment process in accordance with an embodiment of the present disclosure. The terminal device includes an SDK and a host program. As shown in FIG. 15, the payment process may include Steps S601 to S621.

In Step S601, a terminal device scans a payment code to obtain first code information, and the SDK sends a second order query message to the SDK server. The second order inquiry message includes the first code information.

In Step S602, the SDK server sends a second query feedback message to the SDK.

In Step S603, the SDK receives user input and determines the payment amount.

In Step S604, the SDK sends a payment request message to the SDK server.

In Step S605, the SDK server determines whether there is an available payment card.

In Step S606, when there is an available payment card, the SDK server sends a security verification request message to the security control system.

In Step S607, the security control system performs security verification on the payment indicated by the payment request message.

In Step S608, the security control system feeds back security verification result information to the SDK server.

In Step S609, when the security verification result information indicates that the security verification is passed, the SDK server sends a user verification method request message to the host program server.

In Step S610, the host program server responds to the user verification method request message and sends a user verification method feedback message to the SDK server. The user verification method feedback message includes a user verification method identifier.

In Step S611, the SDK server sends a first notification message to the SDK. The first notification message includes the user verification method identifier.

In Step S612, the SDK transmits the user verification method identifier to the host program.

In Step S613, the host program is triggered to display a user verification page that matches the user verification method identifier.

In Step S614, the host program receives first user verification input information input by the user, and sends the first user verification input information to the host program server.

In Step S615, the host program server performs user verification based on the first user verification input information and obtains user verification result information.

In Step S616, the SDK server obtains user verification result information from the host program server. For ease of explanation, the user verification result information obtained directly by the SDK server from the host server is called the second user verification result information.

In Step S617, the host program server sends user verification result information to the host program.

In Step S618, the host program feeds back the user verification result information to the SDK.

In Step S619, the SDK feeds back the user verification result information to the SDK server. For ease of explanation, the user verification result information obtained by the SDK server from the SDK is called the first user verification result information.

In Step S620, when the first user verification result information and the second user verification result information are consistent, the SDK server initiates a payment request to the host program server.

In Step S621, the host program server initiates a payment request to the payer's account management system to complete the payment.

For the specific contents of the above-mentioned Steps S601 to Step S621, refer to the relevant descriptions in the above embodiments, which will not be described again here.

Figure 16:
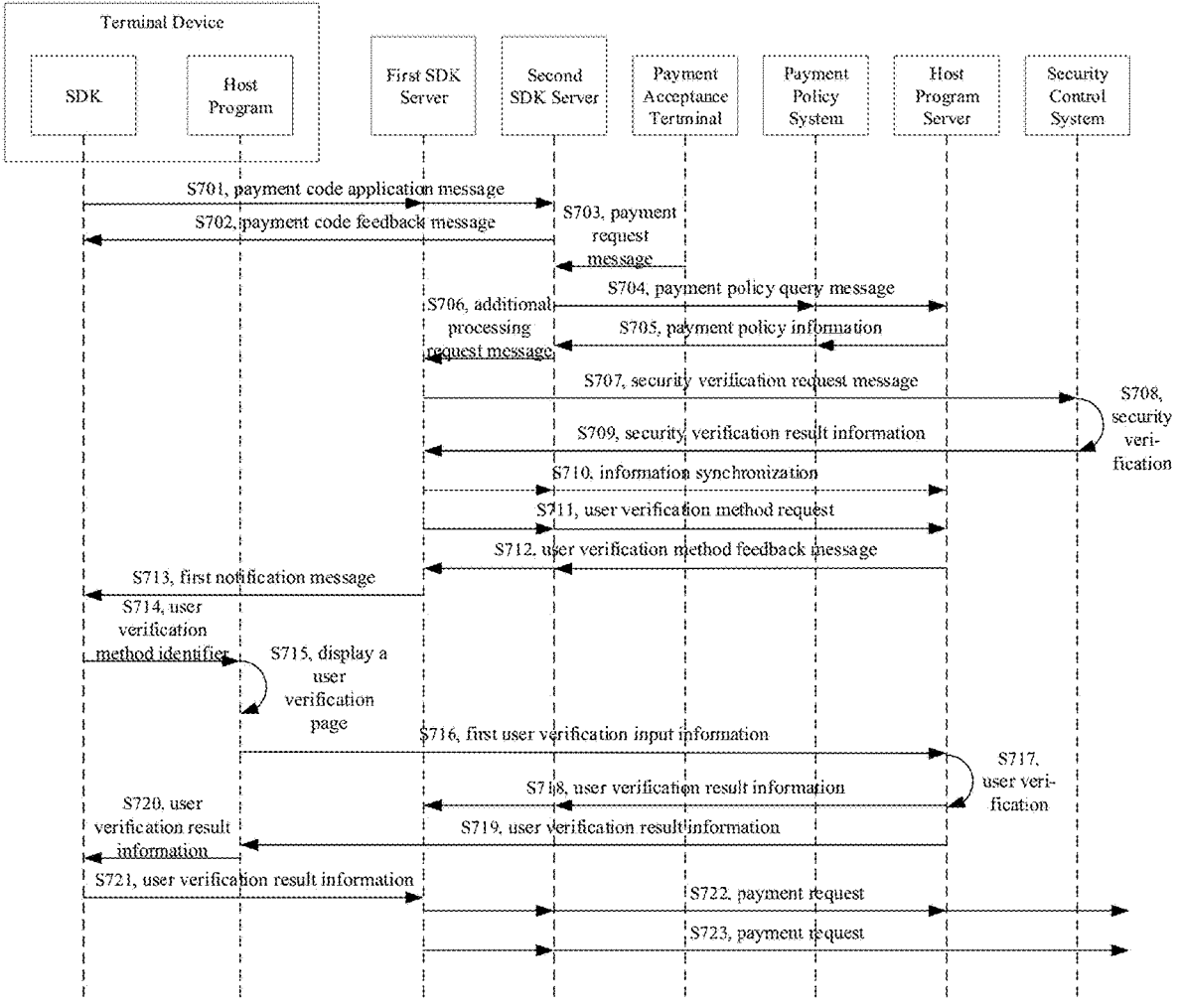
FIG. 16 is a flow chart of yet another example of a payment process in accordance with an embodiment of the present disclosure.

In this scenario, a payment is initiated by a payment acceptance terminal scanning a payment code displayed on a terminal device. The terminal device includes an SDK and a host program. Here, an SDK backend system including an SDK backend subsystem and a payment code subsystem is taken as an example. For the convenience of explanation, the SDK server in the SDK backend subsystem is called the first SDK server, and the SDK server in the payment code subsystem is called the second SDK server. FIG. 16 is a flow chart of another payment process in accordance with an embodiment of the present disclosure. As shown in FIG. 16, the payment process may include Steps S701 to S723.

In Step S701, an SDK in a terminal device sends a payment code application message to a second SDK server through a first SDK server.

In Step S702, the second SDK server assigns a payment code and sends a payment code feedback message to the SDK through the first SDK server. The payment code feedback message includes the payment code.

In Step S703, a payment acceptance terminal scans the payment code displayed on the terminal device, obtains second code information, and sends a payment request message to the second SDK server.

In Step S704, the second SDK server may send a payment policy query message to a host program server through a payment policy system.

In Step S705, the host program server feeds back payment policy information to the second SDK server through the payment policy system.

In Step S706, the second SDK server sends an additional processing request message to the first SDK server. The additional processing request message includes the payment policy information.

In Step S707, the first SDK server sends a security verification request message to the security control system.

In Step S708, the security control system performs security verification on a payment indicated by the payment request message.

In Step S709, the security control system feeds back security verification result information to the first SDK server.

In Step S710, the first SDK server synchronizes payment information, order information and other information to the host program server through the second SDK server.

In Step S711, the first SDK server sends a user verification method request message to the host program server through the second SDK server.

In Step S712, the host program server sends a user verification method feedback message to the first SDK server through the second SDK server. The user verification method feedback message includes a user verification method identifier.

In Step S713, the first SDK server sends a first notification message to the SDK. The first notification message includes the user verification method identifier.

In Step S714, the SDK transmits the user verification method identifier to the host program.

In Step S715, the host program is triggered to display a user verification page that matches the user verification method identifier.

In Step S716, the host program receives first user verification input information input by the user, and sends the first user verification input information to the host program server.

In Step S717, the host program server performs user verification based on the first user verification input information and obtains user verification result information.

In Step S718, the first SDK server obtains the user verification result information from the host program server through the second SDK server. For ease of explanation, the user verification result information obtained by the SDK server from the host server through the second SDK server is called the second user verification result information.

In Step S719, the host program server sends the user verification result information to the host program.

In Step S720, the host program feeds back the user verification result information to the SDK.

In Step S721, the SDK feeds back the user verification result information to the first SDK server. For ease of explanation, the user verification result information obtained by the first SDK server from the SDK is called first user verification result information. If the owners of the host program and the payment card are the same, proceed to Step S724; if the owners of the host program and the payment card are different, proceed to Step S725.

In Step S722, when the first user verification result information and the second user verification result information are consistent, the first SDK server initiates a payment request to a payer account management system through the second SDK server and the host program server to complete the payment.

In Step S723, when the first user verification result information and the second user verification result information are consistent, the first SDK server initiates a payment request to the payer account management system through the second SDK server to complete the payment.

Before the above Steps S722 and S723, when the payment uses payment policy information, the second SDK server may also interact with a payment policy system to honor the payment policy information.

For the specific contents of the above-mentioned Steps S701 to Step S723, refer to the relevant descriptions in the above embodiments, which will not be described again here.

Figure 17:
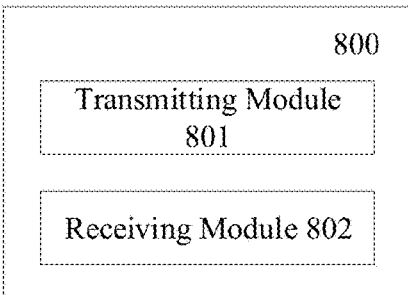
FIG. 17 is a schematic structural diagram of an SDK server in accordance with an embodiment of the fourth aspect of the present disclosure.

A fourth aspect of the present disclosure provides an SDK server. FIG. 17 is a schematic structural diagram of an SDK server in accordance with an embodiment of the fourth aspect of the present disclosure. As shown in FIG. 17, the SDK server 800 may include a transmitting module 801 and a receiving module 802.

The transmitting module 801 may be configured to send a security verification request message to a security control system in response to a received payment request message.

The security verification request message includes security verification information and is used to instruct the security control system to perform security verification on a payment corresponding to the payment request message based on the security verification information.

The receiving module 802 may be configured to receive the security verification result information sent by the security control system.

The transmitting module 801 may also be configured to send a first notification message to the SDK in the terminal device when the security verification result information indicates that the security verification is passed.

The terminal device has an SDK and a host program. The first notification message is used to instruct the SDK to notify the host program to display the user verification page to prompt the user to enter the first user verification input information. The first user verification input information is used by the host program server to perform user verification to obtain user verification result information.

The transmitting module 801 may also be configured to initiate a payment request to complete the payment when the user verification result information indicates that the user verification is passed.

In some embodiments, the transmitting module 801 may be configured to initiate the payment request when the user verification result information satisfies the consistency verification standards.

In some embodiments, the consistency verification standards include: the first user verification result information is consistent with the second user verification result information.

The first user verification result information is user verification result information transmitted by the host program server to the SDK through the host program. The second user verification result information is user verification result information obtained from the host program server.

In the embodiments of the present disclosure, the SDK server responds to the payment request message and sends a security verification request message to the security control system to request the security control system to perform security verification on this payment to complete the security verification required by the SDK owner. When the security verification is passed, the SDK server sends a message to the SDK of the terminal device to instruct the SDK to notify the host program to display a user verification page, so that the SDK may trigger the host program to actively initiate user verification to complete the user identity security verification required by the host program owner. During the payment process, two-way verification is achieved between the SDK owner and the host program owner, which improves the security of the payment and meets the security control needs of the SDK owner and the host program owner.

In some embodiments, the SDK server stores keys used to encrypt and decrypt information exchanged between the SDK and the host program.

In some embodiments, the transmitting module 801 may also be configured to send a user verification method request message to the host program server when the security verification result information indicates that the security verification is passed.

The user verification method request message includes one or more of the order information, terminal device information, and payment information corresponding to the payment indicated by the payment request message.

The receiving module 802 may also be configured to receive a user verification method feedback message sent by the host program server.

The user verification method feedback message includes verification operation information.

The transmitting module 801 may also be configured to send a second notification message to the SDK when the verification operation information includes a payment refusal mark.

The second notification message is used to instruct the SDK to issue a payment refusal prompt message.

The receiving module 802 may also be configured to send a third notification message to the SDK when the verification operation information includes a password-free payment sign.

The third notification message is used to instruct the SDK to issue a password-free payment prompt message.

In some embodiments, the transmitting module 801 may be configured to: send a first notification message to the SDK when the verification operation information includes a user verification method identifier.

The first notification message includes a user verification method identifier, which is used to instruct the SDK to notify the host program to display a user verification page that matches the user verification method identifier, so as to prompt the user to enter first user verification input information that matches the user verification method identifier. In some embodiments, the SDK server may also include a query module.

The query module may be configured to determine a target user verification caller corresponding to a target host program identifier according to the target host program identifier and the pre-set first corresponding relationship.

The first corresponding relationship includes a relationship between host program identifiers and user verification callers.

The transmitting module 801 may be configured to send a first notification message to the SDK when the target user verifies that the caller is the host program.

In some embodiments, the transmitting module 801 may also be configured to send a fourth notification message to the SDK when the target user verifies that the caller is the SDK.

The fourth notification message is used to instruct the SDK to display a user verification page to prompt the user to enter second user verification input information. The second user verification input information is used by the SDK server to perform user verification to obtain user verification result information.

In some embodiments, the SDK server 800 may also include an order identifier generation module.

The order identifier generation module may be configured to generate an order identifier in response to an order request message sent by the merchant system.

The transmitting module 801 may also be configured to send an order feedback message to a merchant system, so that the merchant system sends an SDK call request message to the SDK.

The order feedback message and the SDK call request message include an order identifier.

The transmitting module 801 may also be configured to send a first query feedback message to the SDK in response to the first order query message sent by the SDK.

The first query feedback message includes order information corresponding to the order identifier.

In some embodiments, the order request message includes specified payer identity information.

The transmitting module 801 may also be configured to send a payment suspension notification message to the SDK when the specified payer identity information is inconsistent with the payer identity information of the payment indicated by the payment request message, so that the SDK issues a payment prompt message.

In some embodiments, the receiving module 802 may also be configured to receive a second order query message sent by the SDK of the terminal device.

The second order query message includes first code information obtained by scanning a payment code by the terminal device.

The transmitting module 801 may also be configured to send a second query feedback message to the SDK.

The second query feedback message includes order information corresponding to the first code information.

In some embodiments, the transmitting module 801 may also be configured to send a payment code feedback message to the SDK in response to a received payment code application message.

The payment code application message is sent by the SDK. The payment code feedback message includes the payment code. Correspondingly, the payment request message is generated by a payment acceptance device based on the scanned payment code.

Figure 18:
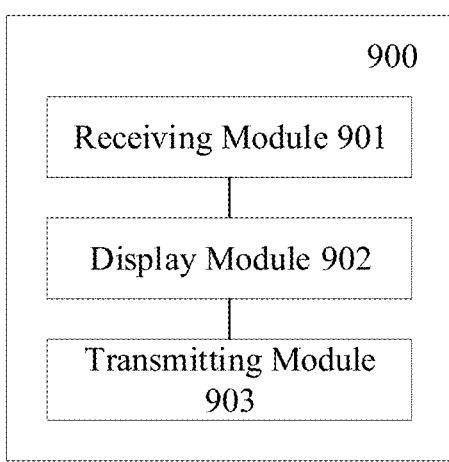
FIG. 18 is a schematic structural diagram of an embodiment of a terminal device in accordance with an embodiment of the fifth aspect of the present disclosure.

A fifth aspect of the present disclosure provides a terminal device. The terminal device has an SDK and a host program. FIG. 18 is a schematic structural diagram of a terminal device in according to an embodiment of the fifth aspect of the present disclosure. As shown in FIG. 18, the terminal device 900 may include a receiving module 901, a display module 902 and a transmitting module 903.

The receiving module 901 may be configured to obtain a first notification message sent by the SDK server through the SDK.

The first notification message is sent by the SDK server based on security verification result information indicating that the security verification is passed. The security verification result information is obtained by the security control system performing security verification on a payment corresponding to the payment request message based on the security verification information in the security verification request message. The security verification request message is sent by the SDK server in response to the received payment request message.

The display module 902 may be configured to, in response to the first notification message, notify the host program to display a user verification page through the SDK to prompt the user to enter first user verification input information.

The transmitting module 903 may be configured to feed back first user verification input information to the host program server through the host program.

The first user verification input information is used by the host program server to perform user verification to obtain user verification result information.

The transmitting module 903 may also be configured to send the user verification result information obtained from the host program server through the host program to the SDK server through the SDK, so that the SDK server may initiate a payment request to complete the payment when the user verification result information indicates that the user has passed the verification.

In some embodiments, the user verification result information is also used to enable the SDK server to initiate a payment request when the user verification result information satisfies the consistency verification standards.

In some embodiments, the consistency verification standards include: the first user verification result information is consistent with the second user verification result information. The first user verification result information is the user verification result information transmitted by the host program server to the SDK through the host program, and the second user verification result information is the user verification result information obtained from the host program server.

In the embodiments of the present disclosure, the SDK server responds to the payment request message and sends a security verification request message to the security control system to request the security control system to perform security verification on this payment to complete the security verification required by the SDK owner. When the security verification is passed, the SDK in the terminal device receives a message sent by the SDK server instructing the SDK to notify the host program to display a user verification page. The SDK responds to the message and triggers the host program to actively initiate user verification to complete a user identity security verification process required by the host program owner. During the payment process, two-way verification is realized between the SDK owner and the host program owner, which improves the security of the payment and meets the security control needs of the SDK owner and the host program owner.

In some embodiments, the SDK has a security domain, and information in the SDK is stored in the security domain.

The information exchanged between the SDK and the host program is encrypted information. The encryption and decryption keys in the SDK are stored in the SDK server. The encryption and decryption keys in the host program are stored in the host program server.

In some embodiments, the display module 902 may also be configured to send a refusal prompt message through the SDK in response to a second notification message received by the SDK.

The second notification message is sent by the SDK server when the verification operation information includes a payment refusal mark.

The display module 902 may also be configured to send a password-free payment prompt message through the SDK in response to a third notification message received by the SDK.

The third notification message is sent by the SDK server after verifying that the operation information includes a password-free payment sign.

Here, the user verification method feedback message includes verification operation information. The user verification method feedback message is sent by the host server in response to a user verification method request message. The user verification method request message is sent by the SDK server to the host program server when the security verification result information indicates that the security verification is passed. The user verification method request message includes one or more of the order information, terminal device information, and payment information corresponding to the payment indicated by the payment request message.

In some embodiments, the first notification message is sent by the SDK server when the verification operation information includes a user verification method identifier. The first notification message includes a user verification method identifier, which is used to instruct the SDK to notify the host program to display a user verification page that matches the user verification method identifier, so as to prompt the user to enter first user verification input information that matches the user verification method identifier.

In some embodiments, the security verification result information includes a target host program identifier. The target host program identifier includes a payment host program identifier corresponding to the payment request message. The first notification message is sent by the SDK server when a target user verification caller is the host program. The target user verification caller is a user verification caller that matches the target host program identifier in the first corresponding relationship. The target host program identifier includes a payment host program identifier corresponding to the payment request message, and the first corresponding relationship includes a relationship between host program identifications and the user verification callers.

In some embodiments, the receiving module 901 may also be configured to obtain a fourth notification message sent by the SDK server through the SDK. The fourth notification message is sent by the SDK server when a target user verifies that the caller is the SDK.

The display module 902 may also be configured to, in response to the fourth notification message, call the SDK to display a user verification page to prompt the user to enter second user verification input information.

The transmitting module 903 may also be configured to feed back second user verification input information to the SDK server through the SDK.

The second user verification input information is used by the SDK server to preform user verification to obtain user verification result information.

In some embodiments, the receiving module 901 may also be configured to receive an SDK call request message through the SDK.

The SDK call request message is generated by a merchant system in response to an order feedback message. The order feedback message and the SDK call request message include an order identifier. The order identifier is generated by the SDK server in response to the order request message sent by the merchant system.

The transmitting module 903 may also be configured to send a first order query message to the SDK server through the SDK in response to an SDK call request message.

The receiving module 901 may also be configured to receive, through the SDK, a first query feedback message sent by the SDK server in response to the first order query message.

The first query feedback message includes order information corresponding to the order identifier.

In some embodiments, the order request message includes specified payer identity information.

The display module 902 may also be configured to send a payment prompt message through the SDK in response to a payment suspension notification message received through the SDK.

The payment suspension notification message is sent by the SDK server when the specified payer identity information is inconsistent with the payer identity information of the payment indicated by the payment request message.

In some embodiments, the terminal device 900 may further include a scanning module.

The scanning module may be configured to scan a payment code and obtain the first code information.

The transmitting module 903 may also be configured to send a second order query message to the SDK server through the SDK.

The second order inquiry message includes first code information.

The receiving module 901 may also be configured to receive a second query feedback message sent by the SDK server through the SDK.

The second query feedback message includes order information corresponding to the first code information.

In some embodiments, the transmitting module 903 may also be configured to send a payment code application message to the SDK server through the SDK.

The receiving module 901 may also be configured to receive a payment code feedback message sent by the SDK server through the SDK, where the payment code feedback message includes the payment code.

The display module 902 may also be configured to display the payment code.

The payment code is used for scanning by a payment acceptance device to generate a payment request message.

Figure 19:
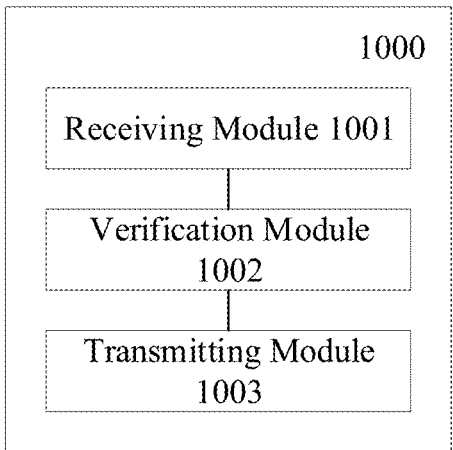
FIG. 19 is a schematic structural diagram of a host program server in accordance with an embodiment of the sixth aspect of the present disclosure.

A sixth aspect of the present disclosure provides a host program server. FIG. 19 is a schematic structural diagram of a host program server in accordance with an embodiment of the sixth aspect of the present disclosure. As shown in FIG. 19, the host program server 1000 may include a receiving module 1001, a verification module 1002, and a transmitting module 1003.

The receiving module 1001 may be configured to receive first user verification input information fed back by a terminal device through a host program.

The terminal device has an SDK and a host program. The first user verification input information is obtained after the SDK notifies the host program to display a user verification page in response to a first notification message. The first notification message is sent by the SDK server based on security verification result information indicating that the security verification is passed. The security verification result information is obtained by the security control system performing security verification on the payment corresponding to the payment request message based on the security verification information in the security verification request message. The security verification request message is sent by the SDK server in response to a received payment request message.

The verification module 1002 may be configured to perform user verification based on the first user verification input information and obtain user verification result information.

The transmitting module 1003 may be configured to send user verification result information to the host program in the terminal device, and transmit the user verification result information to the SDK through the host program, so that the SDK sends the user verification result information to the SDK server. When the user verification result information indicates when the user verification is passed, the SDK server initiates a payment request to complete the payment.

In some embodiments, the transmitting module 1003 may also be configured to send user verification result information to the SDK server, so that the SDK server initiates a payment request when the user verification result information indicates that the user verification is passed and the user verification result information satisfies the consistency verification standards, to complete the payment.

In some embodiments, the consistency verification standards include: the first user verification result information is consistent with the second user verification result information.

The first user verification result information is the user verification result information transmitted by the host program server to the SDK through the host program. The second user verification result information is user verification result information obtained from the host program server.

In the embodiments of the present disclosure, the SDK server responds to the payment request message and sends a security verification request message to the security control system to request the security control system to perform security verification on this payment to complete the security verification required by the SDK owner. When the security verification is passed, the SDK server sends a message to the SDK of the terminal device instructing the SDK to notify the host program to display a user verification page, so that the SDK may trigger the host program to actively initiate user verification. The terminal device may receive the first user verification input information input by the user, and send the first user verification input information to the host program server. The host program server may complete the user identity security verification required by the host program owner. During the payment process, two-way verification is realized between the SDK owner and the host program owner, which improves the security of the payment and meets the security control needs of the SDK owner and the host program owner.

In some embodiments, the host program server stores keys used to encrypt and decrypt information exchanged between the host program and the SDK.

In some embodiments, the receiving module 1001 may also be configured to receive a user verification method request message sent by the SDK server when the security verification result information indicates that the security verification is passed.

The user verification method request message includes one or more of the order information, terminal device information, and payment information corresponding to the payment indicated by the payment request message.

The transmitting module 1003 may also be configured to send a user verification method feedback message to the SDK server according to the user verification method request message.

The user verification method feedback message includes verification operation information.

Here, when the verification operation information includes a payment refusal identifier, the SDK server sends a second notification message to the SDK, and the second notification message is used to instruct the SDK to issue a payment refusal prompt message. When the verification operation information includes a password-free payment sign, the SDK server sends a third notification message to the SDK, and the third notification message is configured to instruct the SDK to send a password-free payment prompt message.

In some embodiments, the first notification message is sent by the SDK server when the verification operation information includes a user verification method identifier. The first notification message includes a user verification method identifier, which is used to instruct the SDK to notify the host program to display a user verification page that matches the user verification method identifier, so as to prompt the user to enter first user verification input information that matches the user verification method identifier.

In some embodiments, the security verification result information includes a target host program identifier. The target host program identifier includes a payment host program identifier corresponding to the payment request message.

The first notification message is sent by the SDK server when the target user verifies that the caller is the host program. The target user verification caller is a user verification caller that matches the target host program identifier in the first corresponding relationship. The target host program identifier includes the payment host program identifier corresponding to the payment request message. The first corresponding relationship includes a relationship between host program identifiers and user verification callers.

Figure 20:
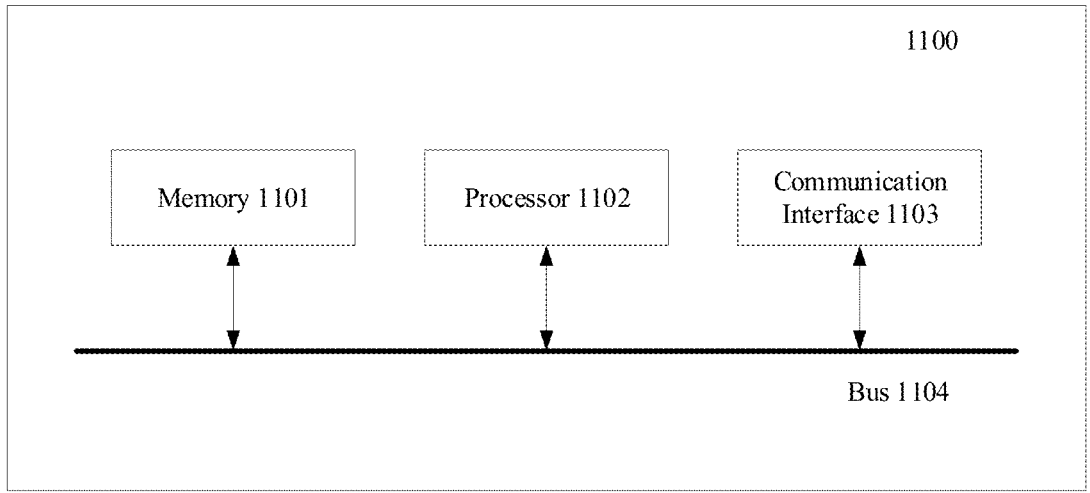
FIG. 20 is a schematic structural diagram of an SDK server in accordance with an embodiment of the seventh aspect of the present disclosure.

The seventh aspect of the present disclosure provides an SDK server. FIG. 20 is a schematic structural diagram of an SDK server in accordance with an embodiment of the seventh aspect of the present disclosure. As shown in FIG. 20, the SDK server 1100 includes a memory 1101, a processor 1102, and a computer program stored on the memory 1101 and executable on the processor 1102.

In some embodiments, the above-mentioned processor 1102 may include a central processing unit (CPU), or an application specific integrated circuit (ASIC), or may be configured to implement one or more integrated circuits of embodiments of the present disclosure.

Memory 1101 may include read-only memory (ROM), random access memory (RAM), magnetic disk storage media devices, optical storage media devices, flash memory devices, electrical, optical or other physical/tangible memory storage devices. Thus, generally, memory includes one or more tangible (non-transitory) computer-readable storage media (e.g., memory devices) encoded with software including computer-executable instructions, and when the software is executed (e.g., by one or multiple processors), it is operable to perform the operations described with reference to the payment methods in the embodiments according to the first aspect of the present disclosure.

The processor 1102 reads the executable program code stored in the memory 1101 to run a computer program corresponding to the executable program code, so as to implement the payment methods in the embodiments of the first aspect.

In some embodiments, SDK server 1100 may also include a communication interface 1103 and a bus 1104. Here, as shown in FIG. 20, the memory 1101, the processor 1102, and the communication interface 1103 are connected through the bus 1104 and complete communication with each other.

The communication interface 1103 is mainly configured to implement communication between modules, devices, units and/or equipment in the embodiments of the present disclosure. Input devices and/or output devices may also be accessed through the communication interface 1103.

Bus 1104 includes hardware, software, or both, coupling the components of SDK server 1100 to each other. By way of example, but not limitation, the bus 1104 may include an accelerated graphics port (AGP) or other graphics bus, an enhanced industry standard architecture (EISA) bus, a front side bus (FSB), hyper transport (HT) interconnect, industry standard architecture (ISA) bus, infinite bandwidth interconnect, low pin count (LPC) bus, memory bus, micro channel architecture (MCA) bus, peripheral component interconnect (PCI) bus, PCI-express (PCI-E) bus, serial advanced technology attachment (SATA) bus, video electronics standards association local bus (VLB) or other suitable bus or a combination of two or more of these. Where appropriate, the bus 1104 may include one or more buses. Although the embodiments of the present disclosure describe and illustrate a specific bus, the present disclosure contemplates any suitable bus or interconnection.

The eighth aspect of the present disclosure provides a terminal device. The terminal device may include a memory, a processor, and a computer program stored in the memory and executable on the processor. For the type and relationship between memory and processor, refer to the relevant descriptions of memory and processor in the above SDK server. The differences from the above-mentioned SDK server include that when the software in the memory is executed, it is operable to perform the operations described with reference to the payment methods in the embodiments according to the second aspect of the present disclosure. In addition, through reading the executable program code stored in the memory, the processor is configured to run the computer program corresponding to the executable program code, so as to implement the payment methods in the embodiments of the second aspect. In some embodiments, the terminal device may also include a communication interface and bus. The memory, processor, and communication interface may be connected through the bus and communicate with each other. The communication connection between the memory, processor, communication interface, and bus may refer to the memory, processor, and communication interface in the SDK server shown in FIG. 20. The communication connection with the bus will not be described again here.

A ninth aspect of the present disclosure provides a host program server. The host program server may include a memory, a processor, and a computer program stored in the memory and executable on the processor. For the type and relationship between memory and processor, refer to the relevant descriptions of memory and processor in the above SDK server. The differences from the above SDK server include that when the software in the memory is executed, it is operable to perform the operations described with reference to the payment methods in the embodiments according to the third aspect of the present disclosure. In addition, through reading the executable program code stored in the memory, the processor is configured to run the computer program corresponding to the executable program code, so as to implement the payment methods in the embodiments of the third aspect. In some embodiments, the host program server may also include a communication interface and bus. The memory, processor, and communication interface may be connected through the bus and communicate with each other. The communication connection between the memory, processor, communication interface, and bus may refer to the memory, processor, and communication interface in the SDK server shown in FIG. 20. The communication connection with the bus will not be described again here.

A tenth aspect of the present disclosure provides a payment system. The payment system may include an SDK server, terminal device and host program server in the above embodiments. For details of the SDK server, terminal device and host program server, refer to the relevant instructions in the above embodiments, which will not be repeated here.

An eleventh aspect of the present disclosure also provides a computer-readable storage medium. Computer program instructions are stored on the computer-readable storage medium. When executed by a processor, the computer program instructions may implement the above embodiments of the payment methods of the first aspect, payment methods of the second aspect, and payment methods of the third aspect, and may achieve the similar technical effects. To avoid duplication, the details will not be described again here. Here, the computer-readable storage media may include non-transitory computer-readable storage media, such as ROM, RAM, magnetic disks or optical disks, etc., which are not limited here.

Embodiments of the present disclosure may also provide a computer program product. When the instructions in the computer program product may be executed by the processors of the SDK server, terminal device, and host program server. When the SDK server, terminal device, and host program server execute the payment methods in the embodiments of the first aspect, payment methods in the embodiments of the second aspect, or payment methods in the embodiments of the third aspect.

It should be noted that embodiments in this specification are described in a progressive manner, and the same or similar parts between the various embodiments may be referred to each other. Each embodiment focuses on its differences from other embodiments. For SDK server embodiments, terminal device embodiments, host program server embodiments, system embodiments, computer-readable storage medium embodiments and computer program product embodiments, relevant information may be found in the descriptions of the method embodiments. The present disclosure is not limited to the specific steps and structures described above and illustrated in the drawings. Those skilled in the art may make various changes, modifications and additions, or change the order between steps after understanding the spirit of the present disclosure. Also, for the sake of brevity, detailed descriptions of known method techniques are omitted here.

Aspects of the present disclosure are described above with reference to flow chart illustrations and/or block diagrams of methods, apparatus (systems) and computer program products according to embodiments of the application. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine such that execution of the instructions via the processor of the computer or other programmable data processing apparatus enables implementation of the functions/actions specified in one or more blocks of a flow chart and/or block diagram. Such a processor may be, but is not limited to, a general-purpose processor, a special-purpose processor, a special application processor, or a field-programmable logic circuit. It will also be understood that each block in the block diagrams and/or flow chart illustrations, and combinations of blocks in the block diagrams and/or flow chart illustrations, may also be implemented by special purpose hardware that performs the specified functions or actions, or may be implemented by special purpose hardware and a combination of computer instructions.

Those skilled in the art should understand that the above embodiments are illustrative rather than restrictive. Different technical features appearing in different embodiments may be combined to achieve beneficial effects. Those skilled in the art should be able to understand and implement other modified embodiments of the disclosed embodiments based on studying the drawings, description and claims. In the claims, the term "comprising" does not exclude other means or steps; the term "a" does not exclude a plurality; the terms "first" and "second" are used to indicate names rather than to indicate any specific order. Any reference signs in the claims shall not be construed as limiting the scope. The functions of several parts appearing in the claims may be implemented by a single hardware or software module. The appearance of certain technical features in different dependent claims does not mean that these technical features cannot be combined to achieve beneficial effects.

What is claimed is:

1. A payment method, comprising:

in a payment process, generating, by a software development kit (SDK) server, an order identifier in response to an order request message sent by a merchant system;

sending, by the SDK server, an order feedback message to the merchant system, and sending, by the merchant system, an SDK call request message to an SDK in a terminal device, wherein the order feedback message and the SDK call request message include the order identifier;

in response to a first order query message sent by the SDK of the terminal device, sending, by the SDK server, a first query feedback message to the SDK, wherein the first query feedback message includes order information corresponding to the order identifier;

transmitting, by the SDK on the terminal device, a payment request message after the SDK receives the first query feedback message;

sending, by the SDK server in response to the payment request message, a security verification request message to a security control system, wherein the payment request message includes the order information, and the security verification request message includes security verification information for instructing a security control system to perform a first security verification initiated by the SDK;

performing, by the security control system, the first security verification for a payment corresponding to the payment request message according to the security verification information;

receiving, by the SDK server, security verification result information sent by the security control system;

in response to that the security verification result information indicates that the security verification is passed, sending, by the SDK server, a first notification message to the SDK in the terminal device, wherein the terminal device has the SDK and a host program;

notifying, based on the first notification message by the SDK on the terminal device, to notify the host program to display a user verification page to prompt a user to enter first user verification input information;

transmitting, by the host program on the terminal device, the first user verification input information to a host program server;

performing, by the host program server based on the first user verification input information sent by the host program, a second security verification on user identity initiated by the host program to obtain user verification result information;

receiving, by the SDK server, from the host program server, the user verification result information; and in response to that the user verification result information indicates that the user verification is passed, initiating a payment request to complete the payment process, wherein two security verifications are completed in the payment process, the first security verification is required by an owner of the SDK, and the second security verification is required by an owner of the host program, to improve a security of the payment process.

2. The method according to claim 1, wherein, after receiving the security verification result information sent by the security control system, the method further comprises:

in response to that the security verification result information indicates that the security verification is passed, sending a user verification method request message to the host program server, wherein the user verification method request message includes one or more of order information corresponding to the payment indicated by the payment request message, terminal device information and payment information;

receiving a user verification method feedback message sent by the host program server, where the user verification method feedback message includes verification operation information;

in response to that the verification operation information includes a payment refusal mark, sending a second notification message to the SDK, and issuing, based on the second notification message by the SDK on the terminal device, a payment refusal prompt message; and in response to that the verification operation information includes a password-free payment sign, sending a third notification message to the SDK, and sending, based on the third notification message by the SDK on the terminal device, a password-free payment prompt message.

3. The method according to claim 2, wherein sending the first notification message to the SDK in the terminal device comprises:

in response to that the verification operation information includes a user verification method identifier, sending the first notification message to the SDK, wherein the first notification message includes the user verification method identifier; and notifying, based on the first notification message by the SDK, the host program to display a user verification page that matches the user verification method identifier, and to prompt the user to input first user verification input information that matches the user verification method identifier.

4. The method according to claim 3, wherein the security verification result information includes a target host program identifier, and the target host program identifier includes a host program identifier for the payment corresponding to the payment request message, wherein, before sending the first notification message to the SDK in the terminal device, the method further includes:

according to the target host program identifier and a pre-set first corresponding relationship, determining a target user verification caller corresponding to the target host program identifier, wherein the first corresponding relationship includes a relationship between host program identifiers and user verification callers; and wherein sending the first notification message to the SDK in the terminal device includes:

in response to that a target user verifies that a caller is the host program, sending the first notification message to the SDK.

5. The method according to claim 4, wherein, after determining the target user verification caller corresponding to the target host program identifier based on the target host program identifier and the pre-set first corresponding relationship, the method further comprises:

in response to that the target user verification caller is the SDK, sending a fourth notification message to the SDK, displaying, based on the fourth notification message by the SDK, a user verification page to prompt the user to enter second user verification input information, and performing, based on the second user verification input information by the SDK server, the user verification to obtain the user verification result information.

6. The method according to claim 1, wherein initiating a payment request comprises:

in response to that the user verification result information satisfies consistency verification standards, initiating the payment request.

7. The method according to claim 6, wherein the consistency verification standards include that first user verification result information is consistent with second user verification result information, wherein the first user verification result information is user verification result information transmitted to the SDK by the host program server through the host program, and the second user verification result information is user verification result information obtained from the host program server.

8. The method according to claim 1, wherein the SDK server stores a key used to encrypt and decrypt information interacted between the SDK and the host program.

9. The method according to claim 1, wherein the order request message includes specified payer identity information, and the method further comprises:

in response to that the specified payer identity information is inconsistent with payer identity information of the payment indicated by the payment request message, sending a payment suspension notification message to the SDK, and issuing, by the SDK, a payment prompt message.

10. The method according to claim 1, wherein, before sending a security verification request message to the security control system in response to the received payment request message, the method further comprises:

receiving a second order query message sent by the SDK of the terminal device, wherein the second order query message includes first code information obtained by scanning a payment code of the terminal device; and sending a second query feedback message to the SDK, wherein the second query feedback message includes order information corresponding to the first code information.

11. The method according to claim 1, wherein, before sending a security verification request message to the security control system in response to the received payment request message, the method further comprises:

in response to a received payment code application message, sending a payment code feedback message to the SDK, wherein the payment code application message is sent by the SDK, and the payment code feedback message includes a payment code, wherein the payment request message is generated by a payment acceptance device based on a scanning of the payment code.

12. A payment system, comprising:

a software development kit (SDK) server comprising at least one first memory and at least one first processor coupled to the at least one first memory;

a terminal device having a SDK and a host program;

a security control system; and a host program server comprising at least one second memory and at least one second processor coupled to the at least one second memory, wherein the at least one first processor of the SDK server is configured to perform:

in a payment process, generating an order identifier in response to an order request message sent by a merchant system;

sending an order feedback message to the merchant system, so that the merchant system sends an SDK call request message to an SDK in a terminal device, wherein the order feedback message and the SDK call request message include the order identifier;

in response to a first order query message sent by the SDK of the terminal device, sending a first query feedback message to the SDK, wherein the first query feedback message includes order information corresponding to the order identifier;

the SDK on the terminal device is configured to transmit a payment request message after receiving the first query feedback message;

the at least one first processor of the SDK server is further configured to perform:

in response to the payment request message transmitted by the SDK, sending a security verification request message to a security control system, wherein the payment request message includes the order information, and the security verification request message includes security verification information for instructing a security control system to perform a first security verification initiated by the SDK;

the security control system is configured to perform the first security verification for a payment corresponding to the payment request message according to the security verification information;

the at least one first processor of the SDK server is further configured to perform:

receiving security verification result information sent by the security control system; and in response to that the security verification result information indicates that the security verification is passed, sending a first notification message to the SDK in the terminal device;

the SDK on the terminal device is further configured to notify, based on the first notification message, the host program to display a user verification page to prompt a user to enter first user verification input information;

the host program on the terminal device is configured to transmit the first user verification input information to the host program server;

the at least one second processor of the host program server is configured to perform, based on the first user verification input information sent by the host program, a second security verification on user identity initiated by the host program to obtain user verification result information; and the at least one first processor of the SDK server is further configured to perform:

receiving from the host program server, the user verification result information; and in response to that the user verification result information indicates that the user verification is passed, initiating a payment request to complete the payment process, wherein two security verifications are completed in the payment process, the first security verification is required by an owner of the SDK, and the second security verification is required by an owner of the host program, to improve a security of the payment process.

13. The payment system according to claim 12, wherein the at least one first processor of the SDK server is further configured to perform: after receiving the security verification result information sent by the security control system, in response to that the security verification result information indicates that the security verification is passed, sending a user verification method request message to the host program server, wherein the user verification method request message includes one or more of order information corresponding to the payment indicated by the payment request message, terminal device information and payment information;

receiving a user verification method feedback message sent by the host program server, where the user verification method feedback message includes verification operation information;

in response to that the verification operation information includes a payment refusal mark, sending a second notification message to the SDK; and in response to that the verification operation information includes a password-free payment sign, sending a third notification message to the SDK;

wherein the SDK on the terminal device is further configured to:

issue, based on the second notification message, a payment refusal prompt message; and send, based on the third notification message, a password-free payment prompt message.

14. The payment system according to claim 13, wherein sending the first notification message to the SDK in the terminal device comprises:

in response to that the verification operation information includes a user verification method identifier, sending the first notification message to the SDK, where the first notification message includes the user verification method identifier; and the SDK on the terminal device is further configured to notify the host program to display a user verification page that matches the user verification method identifier, to prompt the user to input first user verification input information that matches the user verification method identifier.

15. The payment system according to claim 14, wherein the security verification result information includes a target host program identifier, and the target host program identifier includes a host program identifier for the payment corresponding to the payment request message, wherein, before sending the first notification message to the SDK in the terminal device, the at least one first processor of the SDK server is further configured to perform:

according to the target host program identifier and a pre-set first corresponding relationship, determining a target user verification caller corresponding to the target host program identifier, wherein the first corresponding relationship includes a relationship between host program identifiers and user verification callers; and wherein sending the first notification message to the SDK in the terminal device includes: in response to that a target user verifies that a caller is the host program, sending the first notification message to the SDK.

16. The payment system according to claim 15, wherein, after determining the target user verification caller corresponding to the target host program identifier based on the target host program identifier and the pre-set first corresponding relationship, the at least one first processor of the SDK server is further configured to perform:

in response to that the target user verification caller is the SDK, sending a fourth notification message to the SDK, the SDK on the terminal device is further configured to display, based on the fourth notification message, a user verification page to prompt the user to enter second user verification input information, and the at least one first processor of the SDK server is further configured to perform, based on the second user verification input information, the user verification to obtain the user verification result information.

17. The payment system according to claim 12, wherein initiating a payment request comprises:

in response to that the user verification result information satisfies consistency verification standards, initiating the payment request.

18. The payment system according to claim 17, wherein the consistency verification standards include that first user verification result information is consistent with second user verification result information, wherein the first user verification result information is user verification result information transmitted to the SDK by the host program server through the host program, and the second user verification result information is user verification result information obtained from the host program server.

19. The payment system according to claim 12, wherein the SDK server stores a key used to encrypt and decrypt information interacted between the SDK and the host program.

20. The payment system according to claim 12, wherein the order request message includes specified payer identity information, and the at least one first processor of the SDK server is further configured to perform:

in response to that the specified payer identity information is inconsistent with payer identity information of the payment indicated by the payment request message, sending a payment suspension notification message to the SDK, and the SDK on the terminal device is configured to issue a payment prompt message.

\* \* \* \* \*